(12) United States Patent
Suzuki et al.

(10) Patent No.: US 9,456,441 B2
(45) Date of Patent: Sep. 27, 2016

(54) TERMINAL DEVICE, INTEGRATED CIRCUIT, RADIO COMMUNICATION METHOD, AND BASE STATION DEVICE

(71) Applicant: Sharp Kabushiki Kaisha, Osaka-shi, Osaka (JP)

(72) Inventors: Shoichi Suzuki, Osaka (JP); Tatsushi Aiba, Osaka (JP); Kazunari Yokomakura, Osaka (JP); Toshizo Nogami, Osaka (JP); Kimihiko Imamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/440,148

(22) PCT Filed: Oct. 31, 2013

(86) PCT No.: PCT/JP2013/079631
§ 371 (c)(1),
(2) Date: May 1, 2015

(87) PCT Pub. No.: WO2014/069601
PCT Pub. Date: May 8, 2014

(65) Prior Publication Data
US 2015/0282134 A1   Oct. 1, 2015

(30) Foreign Application Priority Data

Nov. 5, 2012 (JP) ................................ 2012-243439
Nov. 9, 2012 (JP) ................................ 2012-246972

(51) Int. Cl.
*H04W 72/12* (2009.01)
*H04W 72/04* (2009.01)
*H04L 5/00* (2006.01)
*H04L 27/26* (2006.01)

(Continued)

(52) U.S. Cl.
CPC .......... *H04W 72/042* (2013.01); *H04L 5/0044* (2013.01); *H04L 27/26* (2013.01); *H04L 27/2662* (2013.01); *H04W 72/0446* (2013.01); *H04L 27/2602* (2013.01); *H04W 72/1289* (2013.01); *H04W 88/02* (2013.01); *H04W 88/08* (2013.01)

(58) Field of Classification Search
None
See application file for complete search history.

(56) References Cited

U.S. PATENT DOCUMENTS

2013/0094458 A1* 4/2013 Sartori ................ H04W 72/042
  370/329
2014/0119253 A1* 5/2014 Weng .................. H04W 72/042
  370/311

(Continued)

OTHER PUBLICATIONS

Ericsson et al., "Resource Element Mapping for Support of CoMP Transmission," 3GPP TSG-RAN WG1 #70bis, R1-124535, Oct. 8, 2012, 2 pages.

(Continued)

*Primary Examiner* — Mohammad Adhami
(74) *Attorney, Agent, or Firm* — Keating & Bennett, LLP

(57) ABSTRACT

A base station device and a terminal device efficiently communicate with each other by using a PDSCH. The base station device and the terminal device determine a starting position of an OFDM symbol for a PDSCH in a serving cell based on a transmission mode relating to transmission of the PDSCH, a DCI format that is used for allocation of the PDSCH, an antenna port that is used for the transmission of the PDSCH, and a higher-layer parameter that is determined from a parameter set for a serving cell in which the PDSCH is received.

14 Claims, 24 Drawing Sheets

(51) Int. Cl.
*H04W 88/02* (2009.01)
*H04W 88/08* (2009.01)

(56) References Cited

U.S. PATENT DOCUMENTS

2014/0119266 A1* 5/2014 Ng .................. H04L 1/0061
370/312

2015/0223208 A1* 8/2015 Park .................. H04L 5/001
370/329
2015/0365209 A1* 12/2015 Yi .................... H04L 5/001
370/329

OTHER PUBLICATIONS

Nogami et al.; "Terminal Device, Communication Method and Integrated Circuit"; U.S. Appl. No. 14/440,635, filed May 5, 2015.

* cited by examiner

FIG. 8

| Transmission mode | DCI format | Search Space | Transmission scheme of PDSCH corresponding to PDCCH |
|---|---|---|---|
| Mode 1 | DCI format 1A | Common and UE specific | Single-antenna port, port 0 |
| | DCI format 1 | UE specific | Single-antenna port, port 0 |
| Mode 2 | DCI format 1A | Common and UE specific | Transmit diversity |
| | DCI format 1 | UE specific | Transmit diversity |
| Mode 3 | DCI format 1A | Common and UE specific | Transmit diversity |
| | DCI format 2A | UE specific | Large delay CDD or Transmit diversity |
| Mode 4 | DCI format 1A | Common and UE specific | Transmit diversity |
| | DCI format 2 | UE specific | Closed-loop spatial multiplexing or Transmit diversity |
| Mode 5 | DCI format 1A | Common and UE specific | Transmit diversity |
| | DCI format 1D | UE specific | Multi-user MIMO |
| Mode 6 | DCI format 1A | Common and UE specific | Transmit diversity |
| | DCI format 1B | UE specific | Closed-loop spatial multiplexing using a single transmission layer |
| Mode 7 | DCI format 1A | Common and UE specific | If the number of PBCH antenna ports is one, Single-antenna port, port 0 is used, otherwise Transmit diversity |
| | DCI format 1 | UE specific | Single-antenna port, port 5 |
| Mode 8 | DCI format 1A | Common and UE specific | If the number of PBCH antenna ports is one, Single-antenna port, port 0 is used, otherwise Transmit diversity |
| | DCI format 2B | UE specific | Dual layer transmission, port 7 and 8 or single-antenna port, port 7 or 8 |
| Mode 9 | DCI format 1A | Common and UE specific | Single-antenna port, port 0 or 7, or Transmit diversity |
| | DCI format 2C | UE specific | Up to 8 layer transmission, ports 7-14 |
| Mode 10 | DCI format 1A | Common and UE specific | Single-antenna port, port 0 or 7, or Transmit diversity |
| | DCI format 2D | UE specific | Up to 8 layer transmission, ports 7-14 |

FIG. 9

| Transmission mode | DCI format | Search Space | Transmission scheme of PDSCH corresponding to EPDCCH |
|---|---|---|---|
| Mode 1 | DCI format 1A | UE specific | Single-antenna port, port 0 |
|  | DCI format 1 | UE specific | Single-antenna port, port 0 |
| Mode 2 | DCI format 1A | UE specific | Transmit diversity |
|  | DCI format 1 | UE specific | Transmit diversity |
| Mode 3 | DCI format 1A | UE specific | Transmit diversity |
|  | DCI format 2A | UE specific | Large delay CDD or Transmit diversity |
| Mode 4 | DCI format 1A | UE specific | Transmit diversity |
|  | DCI format 2 | UE specific | Closed-loop spatial multiplexing or Transmit diversity |
| Mode 5 | DCI format 1A | UE specific | Transmit diversity |
|  | DCI format 1D | UE specific | Multi-user MIMO |
| Mode 6 | DCI format 1A | UE specific | Transmit diversity |
|  | DCI format 1B | UE specific | Closed-loop spatial multiplexing using a single transmission layer |
| Mode 7 | DCI format 1A | UE specific | If the number of PBCH antenna ports is one, Single-antenna port, port 0 is used otherwise Transmit diversity |
|  | DCI format 1 | UE specific | Single-antenna port, port 5 |
| Mode 8 | DCI format 1A | UE specific | If the number of PBCH antenna ports is one, Single-antenna port, port 0 is used, otherwise Transmit diversity |
|  | DCI format 2B | UE specific | Dual layer transmission, port 7 and 8 or single-antenna port, port 7 or 8 |
| Mode 9 | DCI format 1A | UE specific | Single-antenna port, port 0 or 7, or Transmit diversity |
|  | DCI format 2C | UE specific | Up to 8 layer transmission, ports 7-14 |
| Mode 10 | DCI format 1A | UE specific | Single-antenna port, port 0 or 7, or Transmit diversity |
|  | DCI format 2D | UE specific | Up to 8 layer transmission, ports 7-14 |

FIG. 10

| Transmission Mode | DCI format | The starting OFDM symbol for the PDSCH of each cell, $l_{DataStart}$ |
|---|---|---|
| TM 1-9 | DCI format 1, 1A, 1B, 1C, 1D, 2, 2A, 2B or 2C | for a UE configured with transmission mode 1-9, or<br><br>○ if the UE is configured with carrier indicator field for the given serving cell and if PDSCH and the corresponding PDCCH/EPDCCH are received on different serving cells,<br><br>  • the higher-layer parameter *pdsch-Start* for the serving cell on which PDSCH is received<br><br>○ Else (if the UE is not configured with carrier indicator field for the given serving cell or if PDSCH and the corresponding PDCCH/EPDCCH are received on the same serving cell)<br><br>  – if the UE detected DCI format on EPDCCH and if the value for the higher-layer parameter *epdcch-Start* for the serving cell is configured by higher layers,<br><br>    • the higher-layer parameter *epdcch-Start* for the serving cell<br><br>  – if the UE detected DCI format on PDCCH, or<br><br>  – if the UE detected DCI format on EPDCCH and if no value for the higher-layer parameter *epdcch-Start* for the serving cell is configured by higher layers,<br><br>    • the span of the DCI given by the CFI of the serving cell |

FIG. 11

| Transmission Mode | DCI format | The starting OFDM symbol for the PDSCH of each cell, $l_{DataStart}$ |
|---|---|---|
| TM 10 | DCI format 1C | for a UE configured with transmission mode 10 with PDSCH corresponding to PDCCH with DCI format 1C<br>- the span of the DCI given by the CFI of the serving cell |

FIG. 12

| Transmission Mode | DCI format | The starting OFDM symbol for the PDSCH of each cell, $I_{DataStart}$ |
|---|---|---|
| TM 10 | DCI format 1A | for a UE configured with transmission mode 10 with PDSCH corresponding to PDCCH/EPDCCH with DCI format-1A<br>○ if the UE is configured with carrier indicator field for the given serving cell and if PDSCH and the corresponding PDCCH/EPDCCH are received on different serving cells,<br>　- the higher-layer parameter *pdsch-Start* for the serving cell on which PDSCH is received<br>○ Else (if the UE is not configured with carrier indicator field for the given serving cell or if PDSCH and the corresponding PDCCH/EPDCCH are received on the same serving cell)<br>　- if the UE detected DCI format on EPDCCH and if the value for the higher-layer parameter *epdcch-Start* for the serving cell is configured by higher layers,<br>　　▪ the higher-layer parameter *epdcch-Start* for the serving cell or for the EPDCCH set on which EPDCCH was received<br>　- if the UE detected DCI format on PDCCH, or<br>　- if the UE detected DCI format on EPDCCH and if no value for the higher-layer parameter *epdcch-Start* for the serving cell is configured by higher layers,<br>　　▪ the span of the DCI given by the CFI of the serving cell |

FIG. 13

| Transmission Mode | DCI format | The starting OFDM symbol for the PDSCH of each cell, $l_{DataStart}$ |
|---|---|---|
| TM 10 | DCI format 1A | for a UE configured with transmission mode 10 with PDSCH corresponding to PDCCH/EPDCCH with DCI format 1A<br>○ if the UE is configured with carrier indicator field for the given serving cell or if PDSCH and the corresponding PDCCH/EPDCCH are received on different serving cells.<br>• the higher-layer parameter *pdsch-Start* for the serving cell on which PDSCH is received<br>○ Else (if the UE is not configured with carrier indicator field for the given serving cell and if PDSCH and the corresponding PDCCH/EPDCCH are received on the same serving cell)<br>− if the value for the higher-layer parameter 'PDSCH starting position for PDSCH RE mapping' for the serving cell is 0, 1, 2, 3, or 4,<br>• the higher-layer parameter 'PDSCH starting position for PDSCH RE mapping' for DCI format 1A<br>− if the value for the higher-layer parameter 'PDSCH starting position for PDSCH RE mapping' for the serving cell is 5,<br>• the span of the DCI given by the CFI of the serving cell |

FIG. 14

| Transmission Mode | DCI format | The starting OFDM symbol for the PDSCH of each cell, $l_{DataStart}$ |
|---|---|---|
| TM 10 | DCI format 1A | for a UE configured with transmission mode 10 with PDSCH corresponding to PDCCH/EPDCCH with DCI format 1A<br>○ if the UE is configured with carrier indicator field for the given serving cell and if PDSCH and the corresponding PDCCH/EPDCCH are received on different serving cells,<br>　• the higher-layer parameter *pdsch-Start* for the serving cell on which PDSCH is received<br>○ Else (if the UE is not configured with carrier indicator field for the given serving cell or if PDSCH and the corresponding PDCCH/EPDCCH are received on the same serving cell)<br>　− if the UE detected DCI format on EPDCCH and if the value for the higher-layer parameter 'PDSCH starting position for PDSCH RE mapping' for the serving cell is 0, 1, 2, 3, or 4,<br>　　the higher-layer parameter 'PDSCH starting position for PDSCH RE mapping' for DCI format 1A<br>　− if the UE detected DCI format on PDCCH, or<br>　− if the UE detected DCI format on EPDCCH and if the value for the higher-layer parameter 'PDSCH starting position for PDSCH RE mapping' for the serving cell is 5,<br>　　the span of the DCI given by the CFI of the serving cell |

FIG. 15

| Transmission Mode | DCI format | The starting OFDM symbol for the PDSCH of each cell, $l_{DataStart}$ |
|---|---|---|
| TM 10 | DCI format 1A | for a UE configured with transmission mode 10 with PDSCH corresponding to PDCCH/EPDCCH with DCI format 1A<br><br>○ if the UE is configured with carrier indicator field for the given serving cell and if PDSCH and the corresponding PDCCH/EPDCCH are received on different serving cells,<br>• the higher-layer parameter *pdsch-Start* for the serving cell or which PDSCH is received<br><br>○ Else (if the UE is not configured with carrier indicator field for the given serving cell or if PDSCH and the corresponding PDCCH/EPDCCH are received on the same serving cell)<br>– if the UE detected DCI format on USS and if the value for the higher-layer parameter 'PDSCH starting position for PDSCH RE mapping' for the serving cell is 0, 1, 2, 3, or 4,<br>the higher-layer parameter 'PDSCH starting position for PDSCH RE mapping' for DCI format 1A<br>– if the UE detected DCI format on CSS, or<br>– if the UE detected DCI format on USS and if no value for the higher-layer parameter 'PDSCH starting position for PDSCH RE mapping' for the serving cell is 5,<br>the span of the DCI given by the CFI of the serving cell |

FIG. 16

| Transmission Mode | DCI format | The starting OFDM symbol for the PDSCH of each cell, $l_{DataStart}$ |
|---|---|---|
| TM 10 | DCI format 1A | for a UE configured with transmission mode 10 with PDSCH corresponding to PDCCH/EPDCCH with DCI format 1A<br><br>○ if the UE is configured with carrier indicator field for the given serving cell and if PDSCH and the corresponding PDCCH/EPDCCH are received on different serving cells,<br>• the higher-layer parameter *pdsch-Start* for the serving cell on which PDSCH is received<br><br>○ Else (if the UE is not configured with carrier indicator field for the given serving cell or if PDSCH and the corresponding PDCCH/EPDCCH are received on the same serving cell)<br>– if the value for the higher-layer parameter 'PDSCH starting position for PDSCH RE mapping' for the serving cell is 0, 1, 2, 3, or 4,<br>• the higher-layer parameter 'PDSCH starting position for PDSCH RE mapping,' for DCI format 1A<br>– if the UE detected DCI format on EPDCCH and if the value for the higher-layer parameter 'PDSCH starting position for PDSCH RE mapping,' for the serving cell is 5 and if the value for the higher-layer parameter *epdcch-Start* for the serving cell is configured by higher layers,<br>• the higher-layer parameter *epdcch-Start* for the serving cell or for the EPDCCH set on which EPDCCH was received<br>– if the UE detected DCI format on PDCCH and if the value for the higher-layer parameter 'PDSCH starting position for PDSCH RE mapping,' for the serving cell is 5, or<br>– if the UE detected DCI format on EPDCCH and if the value for the higher-layer parameter 'PDSCH starting position for PDSCH RE mapping,' for the serving cell is 5 and if no value for the higher-layer parameter *epdcch-Start* for the serving cell is configured by higher layers,<br>• the span of the DCI given by the CFI of the serving cell |

FIG. 17

| Transmission Mode | DCI format | The starting OFDM symbol for the PDSCH of each cell, $l_{DataStart}$ |
|---|---|---|
| TM 10 | DCI format 2D | for a UE configured with transmission mode 10 with PDSCH corresponding to PDCCH/EPDCCH with DCI format 2D<br><br>– if the value of the 'PDSCH starting position for PDSCH RE mapping' determined from the DCI format 2D for the serving cell on which PDSCH is received is 0, $l_{DataStart}$=0,<br>– if the value of the 'PDSCH starting position for PDSCH RE mapping' determined from the DCI format 2D for the serving cell on which PDSCH is received is 1, $l_{DataStart}$=1,<br>– if the value of the 'PDSCH starting position for PDSCH RE mapping' determined from the DCI format 2D for the serving cell on which PDSCH is received is 2, $l_{DataStart}$=2,<br>– if the value of the 'PDSCH starting position for PDSCH RE mapping' determined from the DCI format 2D for the serving cell on which PDSCH is received is 3, $l_{DataStart}$=3,<br>– if the value of the 'PDSCH starting position for PDSCH RE mapping' determined from the DCI format 2D for the serving cell on which PDSCH is received is 4, $l_{DataStart}$=4,<br>– if the value of the 'PDSCH starting position for PDSCH RE mapping' determined from the DCI format 2D for the serving cell on which PDSCH is received is 5, $l_{DataStart}$=is given by,<br><br>○ if the UE is configured with carrier indicator field for the given serving cell and if PDSCH and the corresponding PDCCH/EPDCCH are received on different serving cells,<br>  • the higher-layer parameter *pdsch-Start* for the serving cell on which PDSCH is received<br>○ Else (if the UE is not configured with carrier indicator field for the given serving cell or if PDSCH and the corresponding PDCCH/EPDCCH are received on the same serving cell)<br>  – if the UE detected DCI format on EPDCCH and if the value for the higher-layer parameter *epdcch-Start* for the serving cell is configured by higher layers,<br>  • the higher-layer parameter *epdcch-Start* for the serving cell or for the EPDCCH set on which EPDCCH was received<br>  – if the UE detected DCI format on PDCCH, or<br>  – if the UE detected DCI format on EPDCCH and if no value for the higher-layer parameter *epdcch-Start* for the serving cell is configured by higher layers,<br>  • the span of the DCI given by the CFI of the serving cell<br><br>– if the subframe is indicated by the 'MBSFN subframe configuration for PDSCH RE mapping' determined from the DCI format 2D for the serving cell on which PDSCH is received, $l_{DataStart}$=min(2, $l_{DataStart}$), otherwise $l_{DataStart}$=$l_{DataStart}$ |

FIG. 18

| Transmission Mode | DCI format | The starting OFDM symbol for the PDSCH of each cell, $l_{DataStart}$ |
|---|---|---|
| TM 10 | DCI format 2D | for a UE configured with transmission mode 10 with PDSCH corresponding to PDCCH/EPDCCH with DCI format 2D<br>– if the value of the 'PDSCH starting position for PDSCH RE mapping' determined from the DCI format 2D for the serving cell on which PDSCH is received is 0, $l'_{DataStart}=0$,<br>– if the value of the 'PDSCH starting position for PDSCH RE mapping' determined from the DCI format 2D for the serving cell on which PDSCH is received is 1, $l'_{DataStart}=1$,<br>– if the value of the 'PDSCH starting position for PDSCH RE mapping' determined from the DCI format 2D for the serving cell on which PDSCH is received is 2, $l'_{DataStart}=2$,<br>– if the value of the 'PDSCH starting position for PDSCH RE mapping' determined from the DCI format 2D for the serving cell on which PDSCH is received is 3, $l'_{DataStart}=3$,<br>– if the value of the 'PDSCH starting position for PDSCH RE mapping' determined from the DCI format 2D for the serving cell on which PDSCH is received is 4, $l'_{DataStart}=4$,<br>– if the value of the 'PDSCH starting position for PDSCH RE mapping' determined from the DCI format 2D for the serving cell on which PDSCH is received is 5, $l'_{DataStart}$ is given by,<br>o if the UE is configured with carrier indicator field for the given serving cell and if PDSCH and the corresponding PDCCH/EPDCCH are received on different serving cells,<br>• the higher-layer parameter *pdsch-Start* for the serving cell on which PDSCH is received<br>o Else (if the UE is not configured with carrier indicator field for the given serving cell or if PDSCH and the corresponding PDCCH/EPDCCH are received on the same serving cell)<br>– if the value for the higher-layer parameter 'PDSCH starting position for PDSCH RE mapping,' for DCI format 1A is 0, 1, 2, 3, or 4,<br>• the higher-layer parameter 'PDSCH starting position for PDSCH RE mapping,' for DCI format 1A<br>– if the value for the higher-layer parameter 'PDSCH starting position for PDSCH RE mapping,' for DCI format 1A is 5,<br>• the span of the DCI given by the CFI of the serving cell<br>– if the subframe is indicated by the 'MBSFN subframe configuration for PDSCH RE mapping' determined from the DCI format 2D for the serving cell on which PDSCH is received or if the subframe is indicated by the 'MBSFN subframe configuration for PDSCH RE mapping,' for DCI format 1A, $l'_{DataStart}=\min(2, l'_{DataStart})$, otherwise $l'_{DataStart}=l'_{DataStart}$. |

FIG. 19

| Transmission Mode | DCI format | The starting OFDM symbol for the PDSCH of each cell, $l_{DataStart}$ |
|---|---|---|
| TM 10 | DCI format 2D | for a UE configured with transmission mode 10 with PDSCH corresponding to PDCCH/EPDCCH with DCI format 2D<br>– if the value of the 'PDSCH starting position for PDSCH RE mapping' determined from the DCI format 2D for the serving cell on which PDSCH is received is 0, $l_{DataStart}$=0,<br>– if the value of the 'PDSCH starting position for PDSCH RE mapping' determined from the DCI format 2D for the serving cell on which PDSCH is received is 1, $l_{DataStart}$=1,<br>– if the value of the 'PDSCH starting position for PDSCH RE mapping' determined from the DCI format 2D for the serving cell on which PDSCH is received is 2, $l_{DataStart}$=2,<br>– if the value of the 'PDSCH starting position for PDSCH RE mapping' determined from the DCI format 2D for the serving cell on which PDSCH is received is 3, $l_{DataStart}$=3,<br>– if the value of the 'PDSCH starting position for PDSCH RE mapping' determined from the DCI format 2D for the serving cell on which PDSCH is received is 4, $l_{DataStart}$=4,<br>– if the value of the 'PDSCH starting position for PDSCH RE mapping' determined from the DCI format 2D for the serving cell on which PDSCH is received is 5, $l_{DataStart}$ is given by,<br>o if the UE is configured with carrier indicator field for the given serving cell and if PDSCH and the corresponding PDCCH/EPDCCH are received on different serving cells,<br>• the higher-layer parameter *pdsch-Start* for the serving cell on which PDSCH is received<br>o Else (if the UE is not configured with carrier indicator field for the given serving cell or if PDSCH and the corresponding PDCCH/EPDCCH are received on the same serving cell)<br>– if the UE detected DCI format on EPDCCH and if the value for the higher-layer parameter 'PDSCH starting position for PDSCH RE mapping' for DCI format 1A is 0, 1, 2, 3, or 4,<br>the higher-layer parameter 'PDSCH starting position for PDSCH RE mapping' for DCI format 1A<br>– if the UE detected DCI format on PDCCH, or<br>– if the UE detected DCI format on EPDCCH and if the value for the higher-layer parameter 'PDSCH starting position for PDSCH RE mapping' for DCI format 1A is 5,<br>the span of the DCI given by the CFI of the serving cell<br>– if the subframe is indicated by the 'MBSFN subframe configuration for PDSCH RE mapping' determined from the DCI format 2D for the serving cell on which PDSCH is received or if the subframe is indicated by the 'MBSFN subframe configuration for PDSCH RE mapping' for DCI format 1A, $l_{DataStart}$=min(2, $l'_{DataStart}$), otherwise $l_{DataStart}$=$l'_{DataStart}$ |

FIG. 20

| Transmission Mode | DCI format | The starting OFDM symbol for the PDSCH of each cell, $l_{DataStart}$ |
|---|---|---|
| TM 10 | DCI format 2D | for a UE configured with transmission mode 10 with PDSCH corresponding to PDCCH/EPDCCH with DCI format 2D<br>— if the value of the 'PDSCH starting position for PDSCH RE mapping' determined from the DCI format 2D for the serving cell on which PDSCH is received is 0, $l_{DataStart}$=0.<br>— if the value of the 'PDSCH starting position for PDSCH RE mapping' determined from the DCI format 2D for the serving cell on which PDSCH is received is 1, $l_{DataStart}$=1.<br>— if the value of the 'PDSCH starting position for PDSCH RE mapping' determined from the DCI format 2D for the serving cell on which PDSCH is received is 2, $l_{DataStart}$=2.<br>— if the value of the 'PDSCH starting position for PDSCH RE mapping' determined from the DCI format 2D for the serving cell on which PDSCH is received is 3, $l_{DataStart}$=3.<br>— if the value of the 'PDSCH starting position for PDSCH RE mapping' determined from the DCI format 2D for the serving cell on which PDSCH is received is 4, $l_{DataStart}$=4.<br>— if the value of the 'PDSCH starting position for PDSCH RE mapping' determined from the DCI format 2D for the serving cell on which PDSCH is received is 5, $l_{DataStart}$ is given by,<br>○ if the UE is configured with carrier indicator field for the given serving cell and if PDSCH and the corresponding PDCCH/EPDCCH are received on different serving cells.<br>• the higher-layer parameter *pdsch-Start* for the serving cell on which PDSCH is received<br>○ Else (if the UE is not configured with carrier indicator field for the given serving cell or if PDSCH and the corresponding PDCCH/EPDCCH are received on the same serving cell)<br>— if the value for the higher-layer parameter 'PDSCH starting position for PDSCH RE mapping' for DCI format 1A is 0, 1, 2, 3, or 4,<br>• the higher-layer parameter 'PDSCH starting position for PDSCH RE mapping' for DCI format 1A<br>— if the UE detected DCI format on EPDCCH and if the value for the higher-layer parameter 'PDSCH starting position for PDSCH RE mapping' for DCI format 1A is 5 and if the value for the higher-layer parameter *epdcch-Start* for the serving cell is configured by higher layers,<br>• the higher-layer parameter *epdcch-Start* for the serving cell or for the EPDCCH set on which EPDCCH was received<br>— if the UE detected DCI format on PDCCH and if the value for the higher-layer parameter 'PDSCH starting position for PDSCH RE mapping' for DCI format 1A is 5, or<br>— if the UE detected DCI format on EPDCCH and if the value for the higher-layer parameter 'PDSCH starting position for PDSCH RE mapping' for DCI format 1A is 5 and if no value for the higher-layer parameter *epdcch-Start* for the serving cell is configured by higher layers,<br>• the span of the DCI given by the CFI of the serving cell<br>— if the subframe is indicated by the 'MBSFN subframe configuration for PDSCH RE mapping' determined from the DCI format 2D for the serving cell on which PDSCH is received or if the subframe is indicated by the 'MBSFN subframe configuration for PDSCH RE mapping' for DCI format 1A, $l_{DataStart}$=min(2, $l_{DataStart}$), otherwise $l_{DataStart}$=$l_{DataStart}$. |

FIG. 21

| Transmission Mode | DCI format | The starting OFDM symbol for the PDSCH of each cell, $l_{DataStart}$ |
|---|---|---|
| TM 10 | DCI format 1A | for a UE configured with transmission mode 10 with PDSCH corresponding to PDCCH/EPDCCH with DCI format 1A, <br><br>if PDSCH is transmitted by antenna port 0-3<br>  • the span of the DCI given by the CFI of the serving cell<br><br>if PDSCH is transmitted by antenna port 7<br>  – if the value of the 'PDSCH starting position for PDSCH RE mapping' corresponding to DCI format 1A for the serving cell on which PDSCH is received is 0, $l_{DataStart}$=0,<br>  – if the value of the 'PDSCH starting position for PDSCH RE mapping' corresponding to DCI format 1A for the serving cell on which PDSCH is received is 1, $l_{DataStart}$=1,<br>  – if the value of the 'PDSCH starting position for PDSCH RE mapping' corresponding to DCI format 1A for the serving cell on which PDSCH is received is 2, $l_{DataStart}$=2,<br>  – if the value of the 'PDSCH starting position for PDSCH RE mapping' corresponding to DCI format 1A for the serving cell on which PDSCH is received is 3, $l_{DataStart}$=3,<br>  – if the value of the 'PDSCH starting position for PDSCH RE mapping' corresponding to DCI format 1A for the serving cell on which PDSCH is received is 4, $l_{DataStart}$=4,<br>  – if the value of the 'PDSCH starting position for PDSCH RE mapping' corresponding to DCI format 1A for the serving cell on which PDSCH is received is 5, $l_{DataStart}$ is given by,<br>    o if the UE is configured with carrier indicator field for the given serving cell and if PDSCH and the corresponding PDCCH/EPDCCH are received on different serving cells,<br>      • the higher-layer parameter *pdsch-Start* for the serving cell on which PDSCH is received<br>    o Else (if the UE is not configured with carrier indicator field for the given serving cell or if PDSCH and the corresponding PDCCH/EPDCCH are received on the same serving cell)<br>      • the span of the DCI given by the CFI of the serving cell<br>  – if the subframe is indicated by the 'MBSFN subframe configuration for PDSCH RE mapping' for DCI format 1A, $l_{DataStart}$=min(2, $l'_{DataStart}$), otherwise $l_{DataStart}$=$l'_{DataStart}$. |

FIG. 22

| Transmission Mode | DCI format | The starting OFDM symbol for the PDSCH of each cell, $l_{DataStart}$ |
|---|---|---|
| TM 10 | DCI format 1A | for a UE configured with transmission mode 10 with PDSCH corresponding to PDCCH/EPDCCH with DCI format 1A.<br>if PDSCH is transmitted by antenna port 0-3<br>  • the span of the DCI given by the CFI of the serving cell<br>if PDSCH is transmitted by antenna port 7<br>  – if the value of the 'PDSCH starting position for PDSCH RE mapping' corresponding to DCI format 1A for the serving cell on which PDSCH is received is 0, $l_{DataStart}=0$,<br>  – if the value of the 'PDSCH starting position for PDSCH RE mapping' corresponding to DCI format 1A for the serving cell on which PDSCH is received is 1, $l_{DataStart}=1$.<br>  – if the value of the 'PDSCH starting position for PDSCH RE mapping' corresponding to DCI format 1A for the serving cell on which PDSCH is received is 2, $l_{DataStart}=2$,<br>  – if the value of the 'PDSCH starting position for PDSCH RE mapping' corresponding to DCI format 1A for the serving cell on which PDSCH is received is 3, $l_{DataStart}=3$,<br>  – if the value of the 'PDSCH starting position for PDSCH RE mapping' corresponding to DCI format 1A for the serving cell on which PDSCH is received is 4, $l_{DataStart}=4$,<br>  – if the value of the 'PDSCH starting position for PDSCH RE mapping' corresponding to DCI format 1A for the serving cell on which PDSCH is received is 5, $l_{DataStart}$ is given by,<br>  o if the UE is configured with carrier indicator field for the given serving cell and if PDSCH and the corresponding PDCCH/EPDCCH are received on different serving cells,<br>    • the higher-layer parameter *pdsch-Start* for the serving cell on which PDSCH is received<br>  o Else (if the UE is not configured with carrier indicator field for the given serving cell or if PDSCH and the corresponding PDCCH/EPDCCH are received on the same serving cell)<br>    – if the UE detected DCI format on EPDCCH and if the value for the higher-layer parameter *epdcch-Start* for the serving cell is configured by higher layers,<br>      • the higher-layer parameter *epdcch-Start* for the serving cell or for the EPDCCH set on which EPDCCH was received<br>    – if the UE detected DCI format on PDCCH, or<br>    – if the UE detected DCI format on EPDCCH and if no value for the higher-layer parameter *epdcch-Start* for the serving cell is configured by higher layers,<br>      • the span of the DCI given by the CFI of the serving cell<br>  – if the subframe is indicated by the 'MBSFN subframe configuration for PDSCH RE mapping' for DCI format 1A, $l_{DataStart}=\min(2, l_{DataStart})$, otherwise $l_{DataStart}=l_{DataStart}$. |

TERMINAL DEVICE, INTEGRATED CIRCUIT, RADIO COMMUNICATION METHOD, AND BASE STATION DEVICE

TECHNICAL FIELD

The present invention relates to a terminal device, an integrated circuit, a radio communication method, and a base station device.

BACKGROUND ART

In the 3rd Generation Partnership Project (3GPP), a radio access method and a radio network for cellular mobile communication (hereinafter referred to as "Long Term Evolution (LTE)," or "Evolved Universal Terrestrial Radio Access (EUTRA)") has been considered. In LTE, an Orthogonal Frequency Division Multiplexing (OFDM) scheme is used as a downlink communication scheme. In LTE, a Single-Carrier Frequency Division Multiple Access (SC-FDMA) scheme is used as an uplink communication scheme. In LTE, a base station device is referred to as an evolved NodeB (eNodeB) and a mobile station device (a terminal device) is referred to as User Equipment (UE). LTE is a cellular communication system in which the landscape is divided in a cellular pattern into multiple cells, each served by a base station device. A single base station device may manage multiple cells. A single mobile station device performs communication in single or multiple cells. A cell that is used for communication is also referred to as a serving cell.

In LTE, a physical downlink shared channel (PDSCH) is used for transmission of data from the base station device to a mobile station device. Furthermore, in the 3GPP, a coordinated multi-point transmission and reception (CoMP) transfer scheme in which multiple base station devices mutually cooperate to perform interference coordination has been considered.

It is proposed that in addition to being determined based on information (a control format indicator (CFI)) that is transmitted on a Physical Control Format Indicator Channel (PCFICH), a starting position of a resource element to which the PDSCH is mapped should be included as one portion of a configuration for PDSCH resource element mapping (NPL 1).

CITATION LIST

Non-Patent Document

NPL 1: "Resource Element Mapping for support of CoMP Transmission," R1-124535, 3GPP TSG-RAN WG1 Meeting #70bis, 8-12 Oct. 2012.

DISCLOSURE OF THE INVENTION

Problems to be Solved by the Invention

However, there is no disclosure of a specific procedure for determining the starting position of the resource element to which the PDSCH is mapped in the radio communication system described above.

An object of the present invention, which is made in view of the problems described, is to provide a terminal device, an integrated circuit, a radio communication method, and a base station device, in which the base station device and the terminal device can perform efficient communication by using the PDSCH.

Means for Solving the Problems (1) In order to accomplish the object described above, the present invention is contrived to provide the following means. That is, according to an aspect of the present invention, there is provided a terminal device that receives transmission on a PDSCH from a base station device in a certain serving cell, the terminal device including: a configuration unit that configures the serving cell with any one of transmission modes 1 to 10 relating to the transmission on the PDSCH, and that, in a case where the serving cell is configured with the transmission mode 10, configures up to 4 parameter sets including at least one parameter set 1 in order to decode the PDSCH; and a reception unit that determines a starting position of an OFDM symbol for the PDSCH in the serving cell based on an index $1_{DataStart}$ in a first slot in a certain subframe, in which, in a case where the serving cell is configured with the transmission mode 10, the PDSCH is assigned by the PDCCH with a DCI format 1A to which CRC parity bits scrambled with C-RNTI are attached, the PDSCH is transmitted by using at least an antenna port 0, and the PDSCH and the PDCCH that corresponds to the PDSCH are received in the same serving cell, the index $1_{DataStart}$ is given based on a value of a control format indicator in the certain subframe in the serving cell, in which, in a case where the serving cell is configured with the transmission mode 10, the PDSCH is assigned by the PDCCH with the DCI format 1A, the PDSCH is transmitted by using an antenna port 7, and a value of a higher-layer parameter that is determined from the parameter set 1 for the serving cell in which the PDSCH is received belongs to {1, 2, 3, 4}, the index $1_{DataStart}$ is given based on the value of the higher-layer parameter that is determined from the parameter set 1 for the serving cell in which the PDSCH is received, and in which, in a case where the serving cell is configured with the transmission mode 10, the PDSCH is assigned by the PDCCH with the DCI format 1A, the PDSCH is transmitted by using the antenna port 7 and the value of the higher-layer parameter that is determined from the parameter set 1 for the serving cell in which the PDSCH is received is a value other than {1, 2, 3, 4}, and the PDSCH and the PDCCH that corresponds to the PDSCH are received in the same serving cell, the index $1_{DataStart}$ is given based on the value of the control format indicator in the certain subframe in the serving cell.

(2) Furthermore, in the terminal device described above, in a case where the serving cell is configured with the transmission mode 10, and the PDSCH is assigned by the PDCCH with a DCI format 1C, the index $1_{DataStart}$ may be given based on the value of the control format indicator in the certain subframe in the serving cell.

(3) Furthermore, in the terminal device described above, in a case where the serving cell is configured with any one of the transmission modes 1 to 9 and the PDSCH and the PDCCH that corresponds to the PDSCH are received in the same serving cell, the index $1_{DataStart}$ may be given based on the value of the control format indicator in the certain subframe in the serving cell.

(4) Furthermore, in the terminal device described above, in a case where the serving cell is configured with the transmission mode 10, the PDSCH is assigned by the PDCCH with a DCI format 2D, and the value of the higher-layer parameter that is determined from one parameter set that is specified from the up to 4 parameter sets based on downlink control information on the serving cell in which the PDSCH is received belongs to {1, 2, 3, 4}, the index $1_{DataStart}$ may be given based on the value of the higher-layer parameter that is determined from the one parameter set that is specified from the up to 4 parameter sets based on the downlink control information on the serving cell in which the PDSCH is received, and in a case where the serving cell is configured with the transmission mode 10, the PDSCH is assigned by the PDCCH with the DCI format 2D and the value of the higher-layer parameter that is determined from the one parameter set that is specified from the up to 4 parameter sets based on the downlink control information on the serving cell in which the PDSCH is received is a value other than {1, 2, 3, 4}, and the PDSCH and the PDCCH that corresponds to the PDSCH are received in the same serving cell, the index $1_{DataStart}$ may be given based on the value of the control format indicator in the certain subframe in the serving cell.

(5) Furthermore, in the terminal device described above, in a case where the serving cell is configured with the transmission mode 10, the PDSCH is assigned by the PDCCH with the DCI format 1A, the PDSCH is transmitted by using the antenna port 7, and the value of the higher-layer parameter that is determined from the parameter set 1 for the serving cell in which the PDSCH is received belongs to {1, 2, 3, 4}, a second index $1'_{DataStart}$ may be given based on the value of the higher-layer parameter that is determined from the parameter set 1 for the serving cell in which the PDSCH is received, in a case where the serving cell is configured with the transmission mode 10, the PDSCH is assigned by the PDCCH with the DCI format 1A, the PDSCH is transmitted by using the antenna port 7 and the value of the higher-layer parameter that is determined from the parameter set 1 for the serving cell in which the PDSCH is received is a value other than {1, 2, 3, 4}, and the PDSCH and the PDCCH that corresponds to the PDSCH are received in the same serving cell, the second index $1'_{DataStart}$ may be given based on the value of the control format indicator in the certain subframe in the serving cell, and in a case where the serving cell is configured with the transmission mode 10, the PDSCH is assigned by the PDCCH with the DCI format 1A, and the PDSCH is transmitted by using the antenna port 7, the index $1_{DataStart}$ may be given based on at least a higher-layer second parameter that is determined from the parameter set 1 for the serving cell in which the PDSCH is received and on the second index $1'_{DataStart}$.

(6) Furthermore, in the terminal device described above, in a case where the serving cell is configured with the transmission mode 10, the PDSCH is assigned by the PDCCH with the DCI format 2D, and the value of the higher-layer parameter that is determined from one parameter set that is specified from the up to 4 parameter sets based on the downlink control information on the serving cell in which the PDSCH is received belongs to {1, 2, 3, 4}, the second index $1'_{DataStart}$ may be given based on the value of the higher-layer parameter that is determined from the one parameter set that is specified from the up to 4 parameter sets based on the downlink control information on the serving cell in which the PDSCH is received, in a case where the serving cell is configured with the transmission mode 10, the PDSCH is assigned by the PDCCH with the DCI format 2D and the value of the higher-layer parameter that is determined from the one parameter set that is specified from the up to 4 parameter sets based on the downlink control information on the serving cell in which the PDSCH is received is a value other than {1, 2, 3, 4}, and the PDSCH and the PDCCH that corresponds to the PDSCH are received in the same serving cell, the second index $1'_{DataStart}$ may be given based on the value of the control format indicator in the certain subframe in the serving cell, and in a case where the serving cell is configured with the transmission mode 10, and the PDSCH is assigned by the PDCCH with the DCI format 2D, the index $1_{DataStart}$ may be given based on at least the higher-layer second parameter that is determined from the one parameter set that is specified from the up to 4 parameter sets based on the downlink control information on the serving cell in which the PDSCH is received and on the second index $1'_{DataStart}$.

(7) Furthermore, according to another aspect of the present invention, there is provided an integrated circuit that is built into a terminal device that receives transmission on a PDSCH from a base station device in a certain serving cell, the integrated circuit causing the terminal device to perform a sequence of functions including: a function of configuring the serving cell with any one of transmission modes 1 to 10 relating to the transmission on the PDSCH; a function of configuring up to 4 parameter sets including at least one parameter set 1 in order to decode the PDSCH in a case where the serving cell is configured with the transmission mode 10; and a function of determining a starting position of an OFDM symbol for the PDSCH in the serving cell based on an index $1_{DataStart}$ in a first slot in a certain subframe, in which, in a case where the serving cell is configured with the transmission mode 10, the PDSCH is assigned by the PDCCH with a DCI format 1A to which CRC parity bits scrambled with C-RNTI are attached, the PDSCH is transmitted by using at least an antenna port 0, and the PDSCH and the PDCCH that corresponds to the PDSCH are received in the same serving cell, the index $1_{DataStart}$ is given based on a value of a control format indicator in the certain subframe in the serving cell, in which, in a case where the serving cell is configured with the transmission mode 10, the PDSCH is assigned by the PDCCH with the DCI format 1A, the PDSCH is transmitted by using an antenna port 7, and a value of a higher-layer parameter that is determined from the parameter set 1 for the serving cell in which the PDSCH is received belongs to {1, 2, 3, 4}, the index $1_{DataStart}$ is given based on the value of the higher-layer parameter that is determined from the parameter set 1 for the serving cell in which the PDSCH is received, and in which, in a case where the serving cell is configured with the transmission mode 10, the PDSCH is assigned by the PDCCH with the DCI format 1A, the PDSCH is transmitted by using the antenna port 7 and the value of the higher-layer parameter that is determined from the parameter set 1 for the serving cell in which the PDSCH is received is a value other than {1, 2, 3, 4}, and the PDSCH and the PDCCH that corresponds to the PDSCH are received in the same serving cell, the index $1_{DataStart}$ is given based on the value of the control format indicator in the certain subframe in the serving cell.

(8) Furthermore, according to a further aspect of the present invention, there is provided a radio transmission method for use in a terminal device that receives transmission on a PDSCH from a base station device in a certain serving cell, the method including: configuring the serving cell with any one of transmission modes 1 to 10 relating to the transmission on the PDSCH; configuring up to 4 parameter sets including at least one parameter set 1 in order to decode the PDSCH in a case where the serving cell is configured with the transmission mode 10; and determining a starting position of an OFDM symbol for the PDSCH in the serving cell based on an index $1_{DataStart}$ in a first slot in a certain subframe, in which, in a case where the serving cell is configured with any one of the transmission modes 1 to 9 and the PDCCH and PDCCH that corresponds to the PDSCH are received in the same serving cell, the index $1_{DataStart}$ is given based on a value of the control format indicator in the certain subframe in the serving cell, in which, in a case where the serving cell is configured with the transmission mode 10, and the PDSCH is assigned by the PDCCH with a DCI format 1C, the second index $1'_{DataStart}$ is given based on the value of the control format indicator in the certain subframe in the serving cell, in which the serving cell is configured with the transmission mode 10, the PDSCH is assigned by the PDCCH with a DCI format 1A to which CRC parity bits scrambled with C-RNI are attached, the PDSCH is transmitted by using at least an antenna port 0, and the PDSCH and the PDCCH that corresponds to the PDSCH are received in the same serving cell, a second index $1'_{DataStart}$ is given based on the value of control format indicator in the certain subframe in the serving cell, in which, in a case where the serving cell is configured with the transmission mode 10, the PDSCH is assigned by the PDCCH with the DCI format 1A, the PDSCH is transmitted by using an antenna port 7, and a value of a higher-layer parameter that is determined from the parameter set 1 for the serving cell in which the PDSCH is received belongs to {1, 2, 3, 4}, the second index $1'_{DataStart}$ is given based on the value of the higher-layer parameter that is determined from the parameter set 1 for the serving cell in which the PDSCH is received, in which, in a case where the serving cell is configured with the transmission mode 10, the PDSCH is assigned by the PDCCH with the DCI format 1A, the PDSCH is transmitted by using the antenna port 7 and the value of the higher-layer parameter that is determined from the parameter set 1 for the serving cell in which the PDSCH is received is a value other than {1, 2, 3, 4}, and the PDSCH and the PDCCH to which the PDSCH corresponds are received in the same serving cell, the second index $1'_{DataStart}$ is given based on the value of the control format indicator in the certain subframe in the serving cell, in which, in a case where the serving cell is configured with the transmission mode 10, the PDSCH is assigned by the PDCCH with the DCI format 1A, and the PDSCH is transmitted by using the antenna port 7, the index $1_{DataStart}$ is given based on at least a higher-layer second parameter that is determined from the parameter set 1 for the serving cell in which the PDSCH is received and on the second index $1'_{DataStart}$, in which, in a case where the serving cell is configured with the transmission mode 10, the PDSCH is assigned by the PDCCH with a DCI format 2D, and the value of the higher-layer parameter that is determined from one parameter set that is specified from the up to 4 parameter sets based on downlink control information for the certain serving cell in which the PDSCH is received belongs to {1, 2, 3, 4}, the second index $1'_{DataStart}$ is given based on the value of the higher-layer parameter that is determined from the one parameter set that is specified from the up to 4 parameter sets based on the downlink control information for the serving cell in which the PDSCH is received, in which, in a case where the serving cell is configured with the transmission mode 10, the PDSCH is assigned by the PDCCH with the DCI format 2D and the value of the higher-layer parameter that is determined from the one parameter set that is specified from the up to 4 parameter sets based on the downlink control information for the serving cell in which the PDSCH is received is a value other than {1, 2, 3, 4}, and the PDSCH and the PDCCH that corresponds to the PDSCH are received in the same serving cell, the second index $1'_{DataStart}$ is given based on the value of the control format indicator in the certain subframe in the serving cell, and in which, in a case where the serving cell is configured with the transmission mode 10, and the PDSCH is assigned by the PDCCH with the DCI format 2D, the index $1_{DataStart}$ is given based on at least the higher-layer second parameter that is determined from the one parameter set that is specified from the up to 4 parameter sets based on the downlink control information for the serving cell in which the PDSCH is received and on the second index $1'_{DataStart}$.

(9) Furthermore, according to still another aspect of the present invention, there is provided a base station device that performs transmission on the PDSCH to a terminal device in a certain serving cell, with transmission modes 1 to 10 relating to the transmission on the PDSCH, the base station device including: a configuration unit that configures the terminal device with up to 4 parameter sets including at least a parameter set 1 in order to decode the PDSCH in a case where the terminal device is configured with any one of the transmission modes 1 to 10 for the serving cell and the terminal device and the serving cell are configured with the transmission mode 10; and a transmission unit that determines a starting position of an OFDM symbol for the PDSCH in the serving cell for the terminal device based on an index $1_{DataStart}$ in a first slot in a certain subframe, in which, in a case where the terminal device and the serving cell are configured with the transmission mode 10, the PDSCH is assigned to the terminal device by the PDCCH with a DCI format 1A to which CRC parity bits scrambled with C-RNTI are attached, the PDSCH for the terminal device is transmitted by using at least an antenna port 0, and the PDSCH for the terminal device and the PDCCH that corresponds to the PDSCH for the terminal device are transmitted in the same serving cell, the index $1_{DataStart}$ is given based on a value of a control format indicator in the certain subframe in the serving cell, and in which, in a case where the terminal device and the serving cell are configured with the transmission mode 10, the PDSCH is assigned to the terminal device by the PDCCH with the DCI format 1A, the PDSCH for the terminal device is transmitted by using an antenna port 7, and a value of a higher-layer parameter that is determined from the parameter set 1 for the serving cell in which the PDSCH for the terminal device is transmitted belongs to {1, 2, 3, 4}, the index $1_{DataStart}$ is given based on the value of the higher-layer parameter that is determined from the parameter set 1 for the serving cell in which the PDSCH for the terminal device is transmitted.

(10) Furthermore, in the base station device described above, in a case where the terminal device and the serving cell are configured with the transmission mode 10, the PDSCH is assigned to the terminal device by the PDCCH with the DCI format 1A, the PDSCH for the terminal device is transmitted by using the antenna port 7 and the value of the higher-layer parameter that is determined from the parameter set 1 for the serving cell in which the PDSCH for the terminal device is transmitted is a value other than {1, 2, 3, 4}, and the PDSCH for the terminal device and the PDCCH that corresponds to the PDSCH for the terminal device are transmitted in the same serving cell, the index $1_{DataStart}$ may be given based on the value of the control format indicator in the certain subframe in the serving cell.

(11) Furthermore, in the base station described above, in a case where the terminal device and the serving cell are configured with the transmission mode 10, and the PDSCH is assigned by the PDCCH with a DCI format 1C, the index $1_{DataStart}$ may be given based on the value of the control format indicator in the certain subframe in the serving cell.

(12) Furthermore, in the base station device described above, in a case where the terminal device and the serving cell are configured with any one of the transmission modes 1 to 9 and the PDSCH and the PDCCH that corresponds to the PDSCH are transmitted in the same serving cell, the index $1_{DataStart}$ may be given based on the value of the control format indicator in the certain subframe in the serving cell.

(13) Furthermore, in the base station device described above, in a case where the terminal device and the serving cell are configured with the transmission mode 10, the PDSCH is assigned to the terminal device by the PDCCH with a DCI format 2D, and the value of the higher-layer parameter that is determined from one parameter set that is specified from the up to 4 parameter sets based on downlink control information on the serving cell in which the PDSCH is transmitted belongs to {1, 2, 3, 4}, the index $1_{DataStart}$ may be given based on the value of the higher-layer parameter that is determined from the one parameter set that is specified from the up to 4 parameter sets based on the downlink control information on the serving cell in which the PDSCH is transmitted, and in a case where the terminal device and the serving cell are configured with the transmission mode 10, the PDSCH is assigned to the terminal device by the PDCCH with the DCI format 2D and the value of the higher-layer parameter that is determined from the one parameter set that is specified from the up to 4 parameter sets based on the downlink control information on the serving cell in which the PDSCH is transmitted is a value other than {1, 2, 3, 4}, and the PDSCH for the terminal device and the PDCCH that corresponds to the PDSCH for the terminal device are transmitted in the same serving cell, the index $1_{DataStart}$ may be given based on the value of the control format indicator in the certain subframe in the serving cell.

(14) Furthermore, in the base station device described above, in a case where the terminal device and the serving cell are configured with the transmission mode 10, the PDSCH is assigned by the PDCCH with the DCI format 1A, the PDSCH for the terminal device is transmitted by using the antenna port 7, and the value of the higher-layer parameter that is determined from the parameter set 1 for the serving cell in which the PDSCH for the terminal device is transmitted belongs to {1, 2, 3, 4}, a second index $1'_{DataStart}$ may be given based on the value of the higher-layer parameter that is determined from the parameter set 1 for the serving cell in which the PDSCH for the terminal device is transmitted, in a case where the terminal device and the serving cell are configured with the transmission mode 10, the PDSCH is assigned to the terminal device by the PDCCH with the DCI format 1A, the PDSCH for the terminal device is transmitted by using the antenna port 7 and the value of the higher-layer parameter that is determined from the parameter set 1 for the serving cell in which the PDSCH for the terminal device is transmitted is a value other than {1, 2, 3, 4} and the PDSCH for the terminal device and the PDCCH that corresponds to the PDSCH for the terminal device are transmitted in the same serving cell, the second index $1'_{DataStart}$ may be given based on the value of the control format indicator in the certain subframe in the serving cell, and in a case where, the terminal device and the serving cell are configured with the transmission mode 10, the PDSCH is assigned to the terminal device by the PDCCH with the DCI format 1A, and the PDSCH for the terminal device is transmitted by using the antenna port 7, the index $1_{DataStart}$ may be given based on at least a higher-layer second parameter that is determined from the parameter set 1 for the serving cell in which the PDSCH for the terminal device is transmitted and on the second index $1'_{DataStart}$.

(15) Furthermore, in the base station device described above, in a case where the terminal device and the serving cell are configured with the transmission mode 10, the PDSCH is assigned to the terminal device by the PDCCH with the DCI format 2D, and the value of the higher-layer parameter that is determined from the one parameter set that is specified from the up to 4 parameter sets based on the downlink control information on the serving cell in which the PDSCH for the terminal device is transmitted belongs to {1, 2, 3, 4}, the second index $1'_{DataStart}$ may be given based on the value of the higher-layer parameter that is determined from the one parameter set that is specified from the up to 4 parameter sets based on the downlink control information on the serving cell in which the PDSCH for the terminal device is transmitted, in a case where the terminal device and the serving cell are configured with the transmission mode 10, the PDSCH is assigned to the terminal device by the PDCCH with the DCI format 2D and the value of the higher-layer parameter that is determined from the one parameter set that is specified from the up to 4 parameter sets based on the downlink control information on the serving cell in which the PDSCH for the terminal device is transmitted is a value other than {1, 2, 3, 4} and the PDSCH for the terminal device and the PDCCH that corresponds to the PDSCH for the terminal device are transmitted in the same serving cell, the second index $1'_{DataStart}$ may be given based on the value of the control format indicator in the certain subframe in the serving cell, and in a case where the terminal device and the serving cell are configured with the transmission mode 10, and the PDSCH is assigned to the terminal device by the PDCCH with the DCI format 2D, the index $1_{DataStart}$ may be given based on at least the higher-layer second parameter that is determined from the one parameter set that is specified from the up to 4 parameter sets based on the downlink control information on the serving cell in which the PDSCH for the terminal device is transmitted and on the second index $1'_{DataStart}$.

Effects of the Invention

According to the present invention, the base station device and the terminal device can efficiently perform communication by using the PDSCH.

BRIEF DESCRIPTION OF THE DRAWINGS

FIG. 8 is a first table for describing a transmission mode according to the present embodiment.

FIG. 9 is a second table for describing the transmission mode according to the present embodiment.

FIG. 10 is a diagram for describing a starting position of an OFDM symbol to which a PDSCH for a mobile station device 1 configured with any one of transmission modes 1 to 9 for a certain cell is mapped, according to the present embodiment.

FIG. 11 is a diagram for describing the starting position of the OFDM symbol to which the PDSCH, which is scheduled by a DCI format 1C, for the mobile station device 1 configured with a transmission mode 10 for a certain cell, is mapped, according to the present embodiment.

FIG. 12 is a diagram for describing a first example of the starting position of the OFDM symbol to which the PDSCH, which is scheduled by the DCI format 1A, for the mobile station device 1 configured with the transmission mode 10 for a certain cell, is mapped, according to the present embodiment.

FIG. 13 is a diagram for describing a second example of the starting position of the OFDM symbol to which the PDSCH, which is scheduled by the DCI format 1A, for the mobile station device 1 configured with the transmission mode 10 for a certain cell, is mapped, according to the present embodiment.

FIG. 14 is a diagram for describing a third example of the starting position of the OFDM symbol to which the PDSCH, which is scheduled by the DCI format 1A, for the mobile station device 1 configured with the transmission mode 10 for a certain cell, is mapped, according to the present embodiment.

FIG. 15 is a diagram for describing a fourth example of the starting position of the OFDM symbol to which the PDSCH, which is scheduled by the DCI format 1A, for the mobile station device 1 configured with the transmission mode 10 for a certain cell, is mapped, according to the present embodiment.

FIG. 16 is a diagram for describing a fifth example of the starting position of the OFDM symbol to which the PDSCH, which is scheduled by the DCI format 1A, for the mobile station device 1 configured with the transmission mode 10 for a certain cell, is mapped, according to the present embodiment.

FIG. 17 is a diagram for describing a first example of the starting position of the OFDM symbol to which the PDSCH, which is scheduled by a DCI format 2D, for the mobile station device 1 configured with the transmission mode 10 for a certain cell, is mapped, according to the present embodiment.

FIG. 18 is a diagram for describing a second example of the starting position of the OFDM symbol to which the PDSCH, which is scheduled by a DCI format 2D, for the mobile station device 1 configured with the transmission mode 10 for a certain cell, is mapped, according to the present embodiment.

FIG. 19 is a diagram for describing a third example of the starting position of the OFDM symbol to which the PDSCH, which is scheduled by a DCI format 2D, for the mobile station device 1 configured with the transmission mode 10 for a certain cell, is mapped, according to the present embodiment.

FIG. 20 is a diagram for describing a fourth example of the starting position of the OFDM symbol to which the PDSCH, which is scheduled by a DCI format 2D, for the mobile station device 1 configured with the transmission mode 10 for a certain cell, is mapped, according to the present embodiment.

FIG. 21 is a diagram for describing a sixth example of the starting position of the OFDM symbol to which the PDSCH, which is scheduled by the DCI format 1A, for the mobile station device 1 configured with the transmission mode 10 for a certain cell, is mapped, according to the present embodiment.

FIG. 22 is a diagram for describing a seventh example of the starting position of the OFDM symbol to which the PDSCH, which is scheduled by the DCI format 1A, for the mobile station device 1 configured with the transmission mode 10 for a certain cell, is mapped, according to the present embodiment.

MODE FOR CARRYING OUT THE INVENTION

Embodiments of the present invention will be described below.

According to the present embodiment, a mobile station device performs transmission and reception in multiple cells at the same time. A technology in which the mobile station device communicates with multiple cells is referred to as a cell aggregation or a carrier aggregation. The present embodiment may be applied to each of the multiple cells that are aggregated. Furthermore, the present embodiment may be applied to some of the multiple cells that are aggregated.

One serving cell among the multiple serving cells is a primary cell (PCell). The primary cell is a cell in which a mobile station device 1 performs an initial connection establishment procedure, a cell in which the mobile station device 1 starts a connection re-establishment procedure, or a cell that is prescribed as the primary cell while handover procedure is in progress.

The serving cells that result from excluding the primary cell from the multiple serving cells are secondary cells (SCell). The secondary cells are used for providing additional radio resources. The secondary cells are used mainly to transmit and receive a PDSCH, a PUSCH, and a PRACH. The secondary cells operate at different frequencies than the primary cell, and are added by a base station device 3 after establishing a connection between the mobile station device 1 and the base station device 3. Furthermore, the mobile station device 1 is notified of the secondary cell by the base station device 3 while the handover procedure is in progress.

Even though the mobile station device performs the transmission and the reception in a single cell, the present embodiment may be applied.

The present embodiment will be described below referring to a radio communication system in compliance with a Frequency Division Duplex (FDD) scheme. However, the present embodiment can be applied also to a radio communication system in compliance with a Time Division Duplex (TDD) scheme. Furthermore, the present embodiment can be applied also to a radio communication system in which a cell using the TDD scheme and a cell using the FDD scheme are aggregated.

Figure 1:
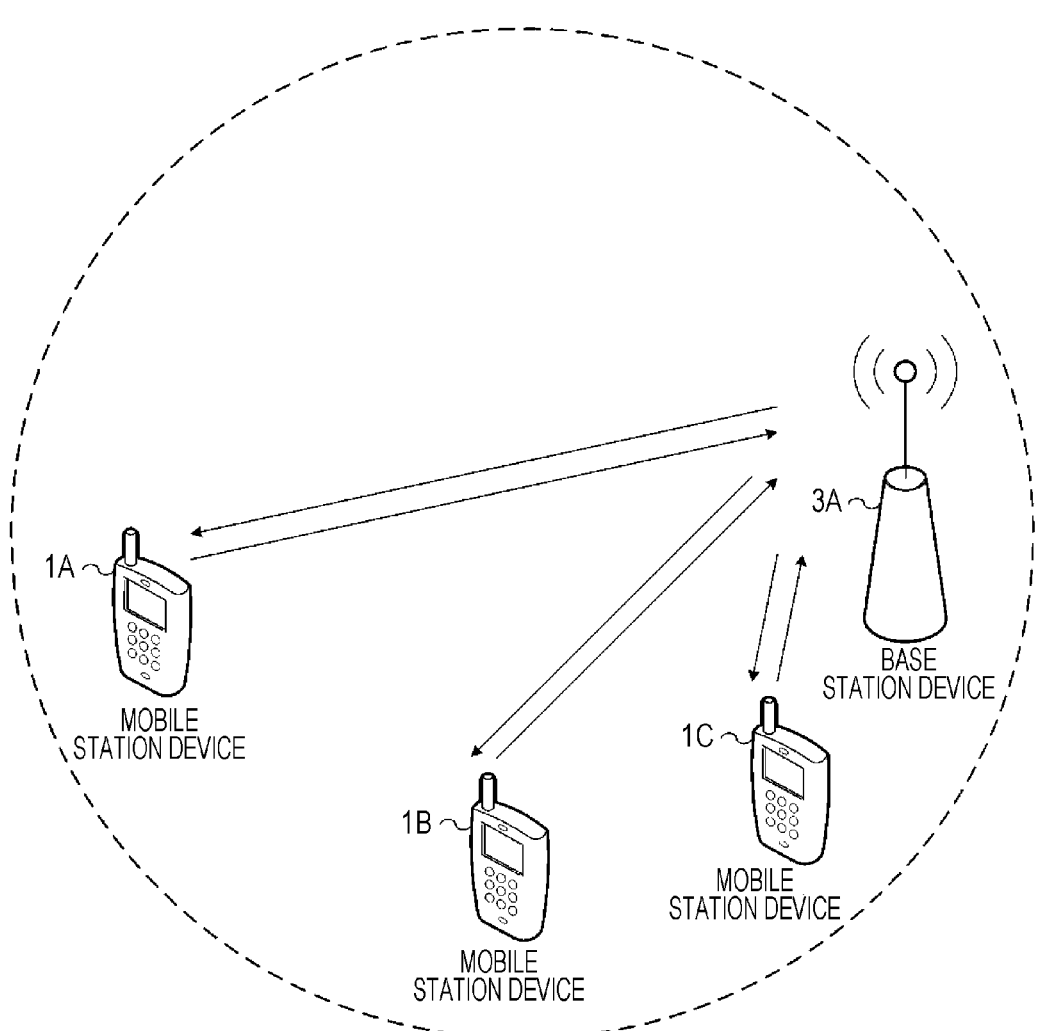
FIG. 1 is a diagram of a radio communication system according to the present embodiment.

FIG. 1 is a diagram of a radio communication system according to the present embodiment. In FIG. 1, the radio communication system includes mobile station devices 1A to 1C and the base station device 3. The mobile station devices 1A to 1C are referred to as the mobile station device 1.

A physical channel and a physical signal according to the present embodiment will be described below.

In FIG. 1, the following uplink physical channels are used for uplink radio communication from the mobile station device 1 to the base station device 3. The uplink physical channel is used to transmit information that is output from a higher layer.

Physical Uplink Control Channel (PUCCH)
Physical Uplink Shared Channel (PUSCH)
Physical Random Access Channel (PRACH)

The PUCCH is used to transmit uplink control information (UCI). HARQ-ACK (HARQ feedback, response information) to downlink data (Downlink-Shared Channel: DL-SCH) is included in the uplink control information.

The PUSCH is used to transmit uplink data (Uplink-Shared Channel: UL-SCH). The PUSCH may be used to transmit the uplink control information along with the uplink data. The PUSCH may be used to transmit only the uplink control information.

The PRACH is used to transmit a random access preamble. A principal object of the PRACH is for the mobile station device 1 to be synchronized to the base station device 3 in terms of a time domain.

In FIG. 1, the following uplink physical signal is used for the uplink radio communication. The uplink physical signal is not used to transmit the information that is output from the higher layer, but is used by a physical layer.

Uplink Reference Signal (UL RS)

According to the present embodiment, the following 2 types of uplink reference signal are used.

Demodulation Reference Signal (DMRS)
Sounding Reference Signal (SRS)

The DMRS is associated with transmission of the PUSCH or the PUCCH. The DMRS is time-multiplexed together with the PUSCH or the PUCCH. The base station device 3 performs demodulation processing of the PUSCH or the PUCCH by using the DMRS. Transmission of the PUSCH and the DMRS taken together is hereinafter simply also referred to as transmission of the PUSCH. Transmission of the PUCCH and the DMRS taken together is hereinafter simply also referred to as transmission of the PUCCH.

The SRS is not associated with the transmission of the PUSCH or the PUCCH. The base station device 3 uses the SRS in order to measure an uplink channel state. A symbol that is transmitted by the SRS is also referred to as a sounding reference symbol. The SRS will be described in detail below.

In FIG. 1, the following downlink physical channels are used for downlink radio communication from the base station device 3 to the mobile station device 1. The downlink physical channels are used to transmit the information that is output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used to report system information (a Master Information Block, Broadcast Channel (BCH)) that is used in common in the mobile station device 1. The PBCH is transmitted at an interval of 40 ms. Timings at an interval of 40 ms are blind-detected in the mobile station device 1. Furthermore, the PBCH is retransmitted at an interval of 10 ms.

The PCFICH is used to transmit information indicating a region (an OFDM symbol) that is reserved for transmission of the PDCCH. The information is referred to as a control format indicator (CFI). In a case where the number of OFDM symbols that are used for the transmission of the PDCCH in a certain subframe is greater than 0, the PCFICH is transmitted in the subframe.

In a case where a cell bandwidth is greater than 11 physical resource blocks, the number of OFDM symbols that are used for the transmission of the PDCCH (DCI) in a certain subframe is equal to a value of the CFI that is transmitted on the PCFICH in the certain subframe. In a case where the cell bandwidth is 10 physical resource blocks or smaller, the number of OFDM symbols that are used for the transmission of the PDCCH (the DCI) is one greater than the value of the CFI that is transmitted on the PCFICH in the certain subframe.

Moreover, "the number of OFDM symbols that are used for the transmission of the PDCCH (the DCI)" is also referred to as a "span of the DCI." The span of the DCI for a certain cell is determined based on the CFI that is transmitted on the PCFICH in the certain subframe.

The PHICH is used to transmit a HARQ indicator (the HARQ feedback, the response information) indicating the HARQ-ACK to the uplink data (the Uplink Shared Channel (UL-SCH)) that is received by the base station device 3. For example, in a case where the mobile station device 1 receives the HARQ indicator indicating an ACK, a corresponding uplink data is not retransmitted. For example, in a case where the mobile station device 1 receives the HARQ indicator indicating a NACK, the corresponding uplink data is retransmitted.

The PDCCH and the EPDCCH are used to transmit downlink control information (DCI). The downlink control information is also referred to as a DCI format. The downlink control information includes a downlink grant (or also referred to as "downlink assignment") and an uplink grant. The downlink grant is the downlink control information that is used for scheduling of a single PDSCH within a single cell. The downlink grant is used for the scheduling of the PDSCH within a subframe that is the same as the subframe in which the downlink grant is transmitted. The uplink grant is the downlink control information that is used for scheduling of a single PUSCH within a single cell. The uplink grant is used for the scheduling of the single PUSCH within the fourth or later subframe after the subframe in which the uplink grant is transmitted.

The PDSCH is used to transmit downlink data (Downlink Shared Channel (DL-SCH)).

The PMCH is used to transmit a multicast channel.

In FIG. 1, the following downlink physical signals are used for the downlink radio communication. The downlink physical signal is not used to transmit the information that is output from the higher layer, but is used by the physical layer.

Synchronization signal (SS)
Downlink Reference Signal (DL RS)

The synchronization signal is used in order for the mobile station device 1 to be synchronized in terms of downlink frequency and time domains.

The downlink reference signal is used in order for the mobile station device 1 to perform channel reconfiguration of the downlink physical channel. The downlink reference signal is used in order for the mobile station device 1 to calculate downlink channel state information.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The physical channel and the physical signal are not transmitted over multiple cells. The physical channel and the physical signal are transmitted in any one cell.

BCH, UL-SCH, and DL-SCH are transport channels. A channel that is used in a Medium Access Control (MAC) layer is referred to as a transport channel. Furthermore, the transport channel is also referred to as a transport block.

A configuration of a radio frame according to the present embodiment will be described below.

Figure 2:
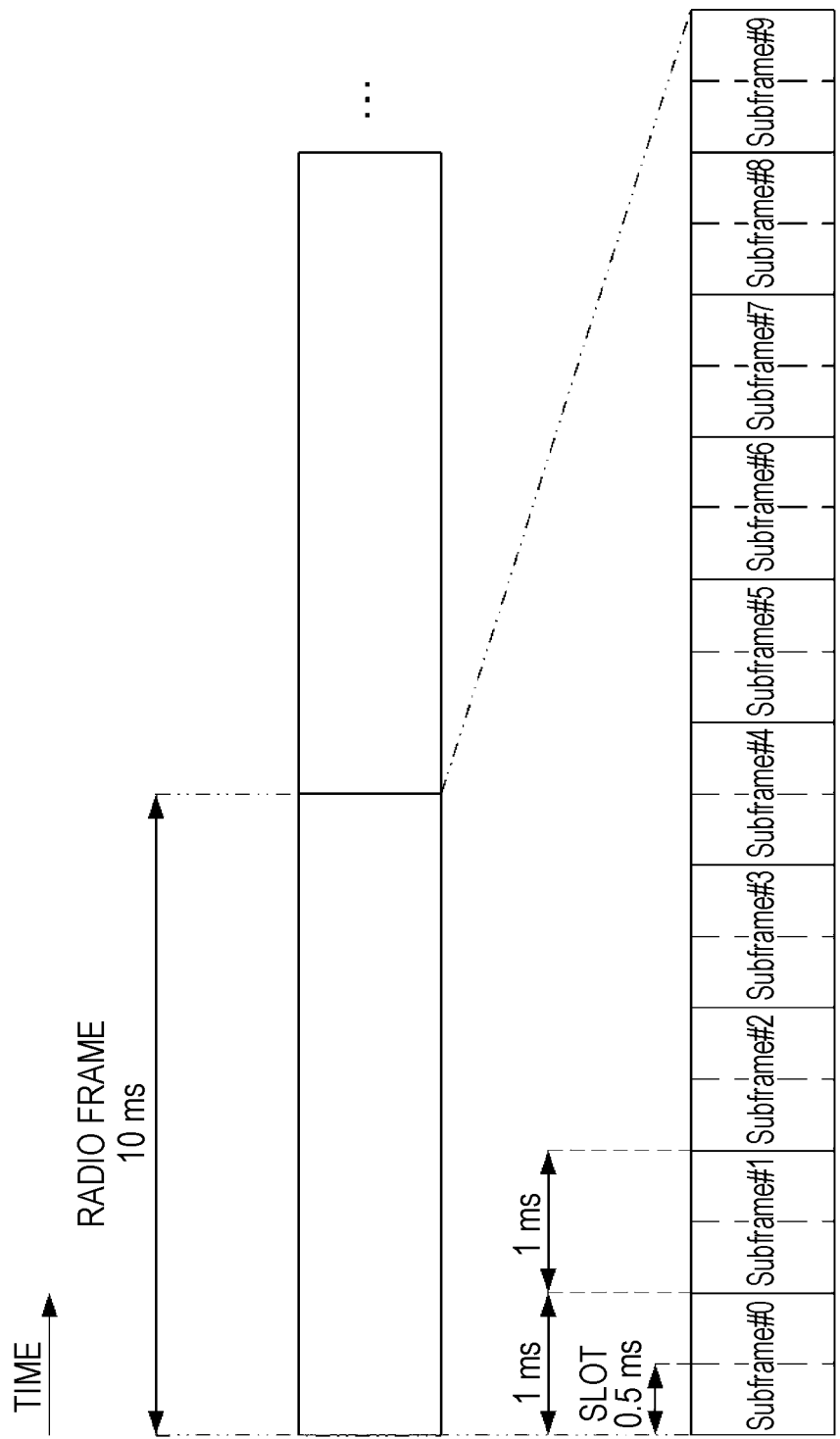
FIG. 2 is a diagram illustrating a schematic configuration of a radio frame according to the present embodiment.

FIG. 2 is a diagram illustrating a schematic configuration of the radio frame according to the present embodiment. For each of the multiple cells, the radio frames are configured in the same manner. Each of the radio frames is 10 ms in length. Furthermore, each of the radio frames is configured from 10 subframes. Each of the subframes is 1 ms in length, and is defined by two consecutive slots. An i-th subframe within the radio frame is configured from a (2×i)-th slot and a (2×i+1)-th slot. Each of the slots is 0.5 ms in length.

A configuration of the slot according to the present embodiment will be described below.

Figure 3:
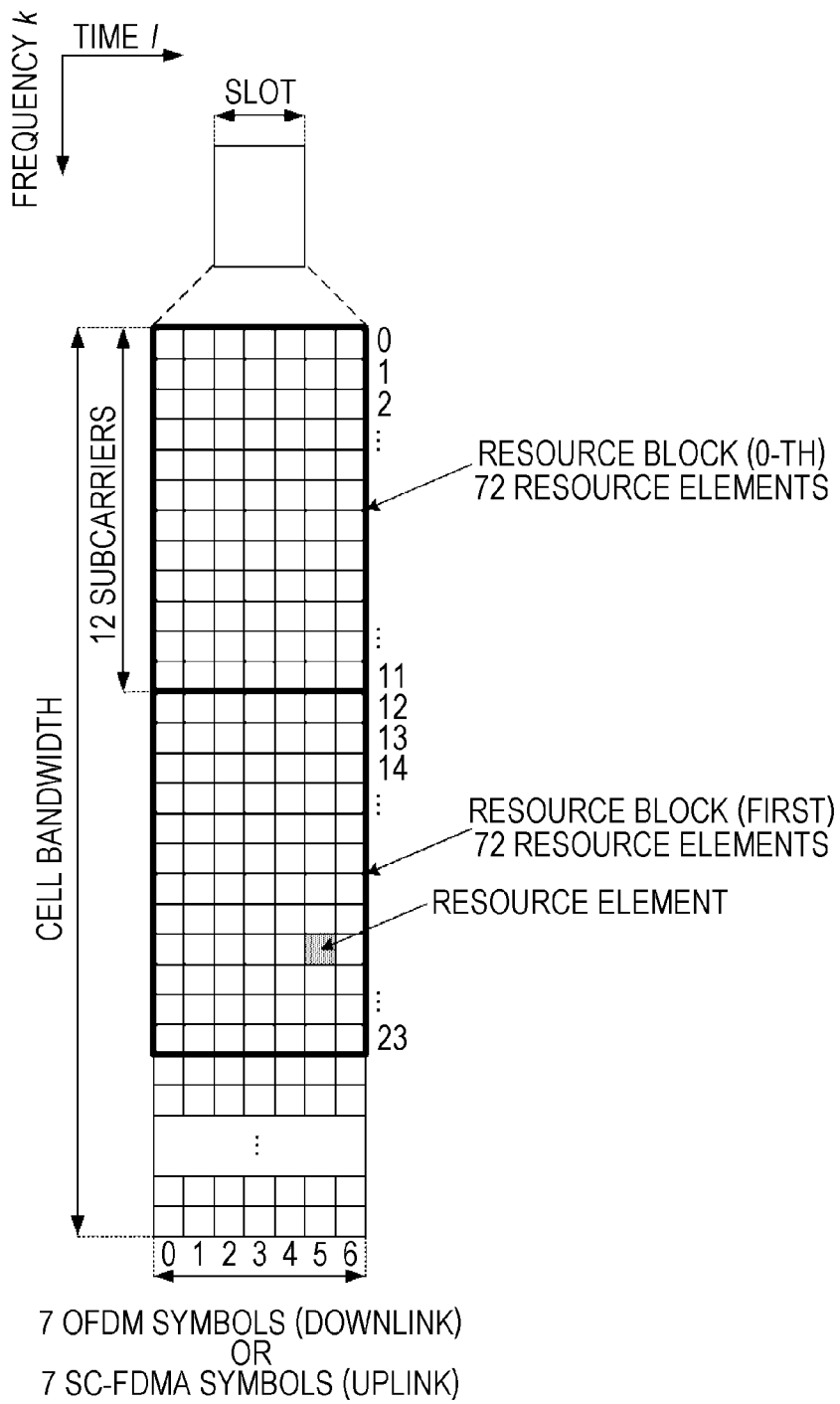
FIG. 3 is a diagram illustrating a configuration of a slot according to the present embodiment.

FIG. 3 is a diagram illustrating the configuration of the slot according to the present embodiment. The physical signal or physical channel that is transmitted in each of the slots is expressed by a resource grid. In the downlink, a resource grid is defined by multiple subcarriers and multiple OFDM symbols. In the uplink, the resource grid is defined by multiple subcarriers and multiple SC-FDMA symbols. The number of subcarriers that construct one slot depends on an uplink bandwidth or a downlink bandwidth for a cell. The number of OFDM symbols or SC-FDMA symbols that construct one slot is 7.

Each of the elements within the resource grid is referred to as a resource element. The resource element is identified by using a subcarrier number k (0, 1, and so forth), and an OFDM symbol number 1 (0, 1, and so forth up to 6) or a SC-FDMA symbol number 1 (0, 1, and so forth up to 6) within a slot.

A resource block is used to express mapping of a certain physical channel (the PDSCH, the PUSCH, or the like) to elements. The resource block is defined by a virtual resource block and a physical resource block. A certain physical channel is first mapped to the virtual resource block. Thereafter, the virtual resource block is mapped to the physical resource block. One physical resource block is defined by 7 consecutive OFDM symbols or SC-FDMA symbols in the time domain and by 12 consecutive subcarriers in the frequency domain. Therefore, one physical resource block is configured from (7×12) resource elements. Furthermore, one physical resource block corresponds to one slot in the time domain, and corresponds to 180 kHz in the frequency domain. The physical resource block is numbered from 0 in the frequency domain.

The physical channel and the physical signal that are transmitted in each of the subframes will be described below.

Figure 4:
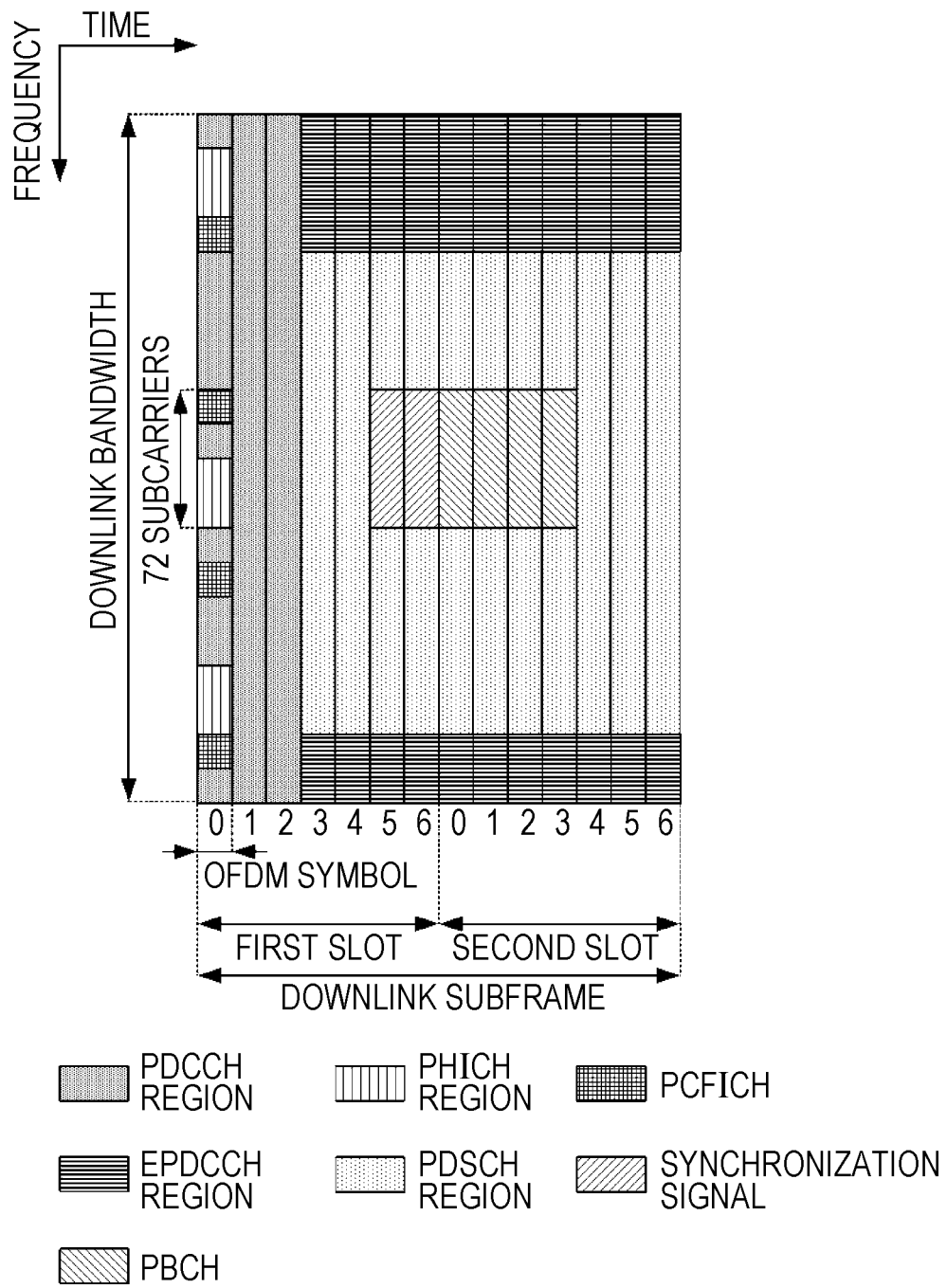
FIG. 4 is a diagram illustrating one example of arrangement of physical channels and physical signals in a downlink subframe according to the present embodiment.

FIG. 4 is a diagram illustrating one example of arrangement of the physical channels and the physical signals in a downlink subframe according to the present embodiment. In the downlink subframe, the base station device 3 can transmit the downlink physical channel (the PBCH, the PCFICH, the PHICH, the PDCCH, the EPDCCH, PDSCH), and the downlink physical signal (the synchronization signal, the downlink reference signal). Moreover, the PBCH is transmitted only in a subframe 0 within the radio frame. Moreover, the synchronization signal is arranged only in subframes 0 and 5 within the radio frame. Moreover, the downlink reference signal is arranged in the resource elements that are distributed in the frequency domain and the time domain. The downlink reference signal is not illustrated in FIG. 4 for brief description.

The PCFICH is arranged in an initial OFDM symbol in a first slot. The PHICH is arranged in the initial OFDM symbol in the first slot.

In a PDCCH region, multiple PDCCH's are frequency- and time-multiplexed. The PDCCH is arranged, starting from an initial OFDM symbol in the first slot. The span of the DCI is determined based on the CFI.

In an EPDCCH region, multiple EPDCCH's are frequency- and time-multiplexed. The base station device 3 may transmit information indicating a starting position of the OFDM symbol in which the EPDCCH is arranged in the first slot in the subframe to the mobile station device 1. "Information indicating a starting position of the OFDM symbol in which the EPDCCH is arranged is referred to as "epdcch-Start." The "starting position of the OFDM symbol in which the EPDCCH is arranged" is also referred to as a "starting position for EPDCCCH resource mapping" and "a starting position of the resource element to which the EPDCCH is mapped."

The base station device 3 configures the epdcch-Start for every cell. In a case where the mobile station device 1 is configured with a specific transmission mode (for example, a transmission mode 10), the base station device 3 may configure each of the EPDCCH regions with a different epdcch-Start. A transmission mode will be described below.

Based on the received epdcch-Start, the mobile station device 1 determines the starting position of the OFDM symbol in which the EPDCCH is arranged in the first slot in the subframe. In a case where the epdcch-Start is not received, based on the span of the DCI, the mobile station device 1 determines the starting position of the OFDM symbol in which the EPDCCH is arranged in the first slot in the subframe. For example, in a case where the span of the DCI is 3 (in a case where the PDCCH region is configured from the first, second, and third OFDM symbols in the first slot in the subframe) the mobile station device 1 determines that the EPDCCH is arranged in the first slot in the subframe, starting from the fourth OFDM symbol.

In a PDSCH region, multiple PDSCH's are frequency- and space-multiplexed. The starting position of the OFDM symbol in which PDSCH is arranged will be described below.

The PDCCH is time-multiplexed along with the PDSCH and the EPDCCH. The EPDCCH is frequency-multiplexed along with the PDSCH.

A PDCCH resource will be described below.

The PDCCH is mapped to one PDCCH candidate. One PDCCH candidate is configured from one or multiple consecutive control channel elements (CCE's). The CCE is arranged in the PDCCH region.

Figure 5:
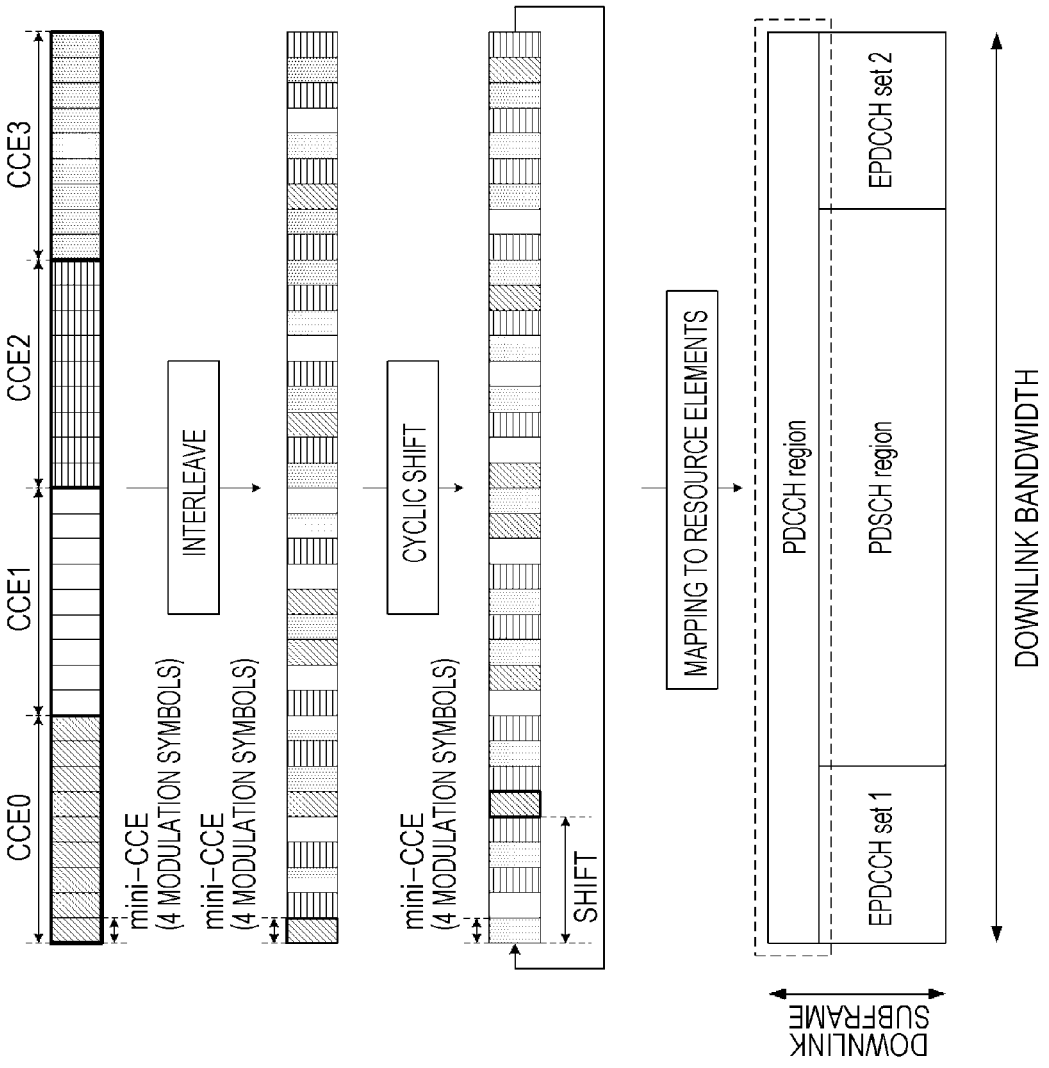
FIG. 5 is a diagram illustrating a method of mapping a PDCCH according to the present embodiment to a resource element.

FIG. 5 is a diagram illustrating a method of mapping the PDCCH according to the present embodiment to the resource element. One CCE is used to transmit 36 modulation symbols (complex-valued symbols). One CCE is configured from 9 mini-CCE's. One mini-CCE is configured from 4 modulation symbols. The base station device 3 maps one mini-CCE to one resource element group. One resource element group is configured from 4 consecutive resource elements in the frequency domain. To be more precise, one modulation symbol is mapped to one resource element.

The base station device 3 interleaves the CCE's in units of mini-CCE. Next, the base station device 3 cyclic-shifts the mini-CCE's that are interleaved. A value of the cyclic shift is a value of physical layer cell identity (PCI). To be more precise, among cells that have different physical layer cell identities, the cyclic shifts having different values are performed. Accordingly, interference with the PDCCH among cells can be randomized. Moreover, the mobile station device 1 can detect a physical layer cell identity from the synchronization signal. Furthermore, the base station device 3 can transmit a handover command that includes information indicating the physical layer cell identity to the mobile station device 1.

Next, the base station device 3 maps a cyclic-shifted mini-CCE to the resource element group in the PDCCH region. The base station device 3 maps the mini-CCE to the PDCCH to resource elements other than the resource elements to which the PHICH and the PCFICH are mapped.

An EPDCCH resource will be described below.

The EPDCCH is mapped to one EPDCCH candidate. One EPDCCH candidate is configured from one or multiple consecutive enhanced control channel elements (ECCE's). Multiple EPDCCH regions may be defined for a single mobile station device. The base station device 3 transmits information indicating one or multiple physical resource blocks that construct the EPDCCH region, to the mobile station device 1. The ECCE is defined for each of the EPDCCH regions. Furthermore, a single ECCE is arranged in a single EPDCCH region. The EPDCCH region is also referred to as an EPDCCH set.

Figure 6:
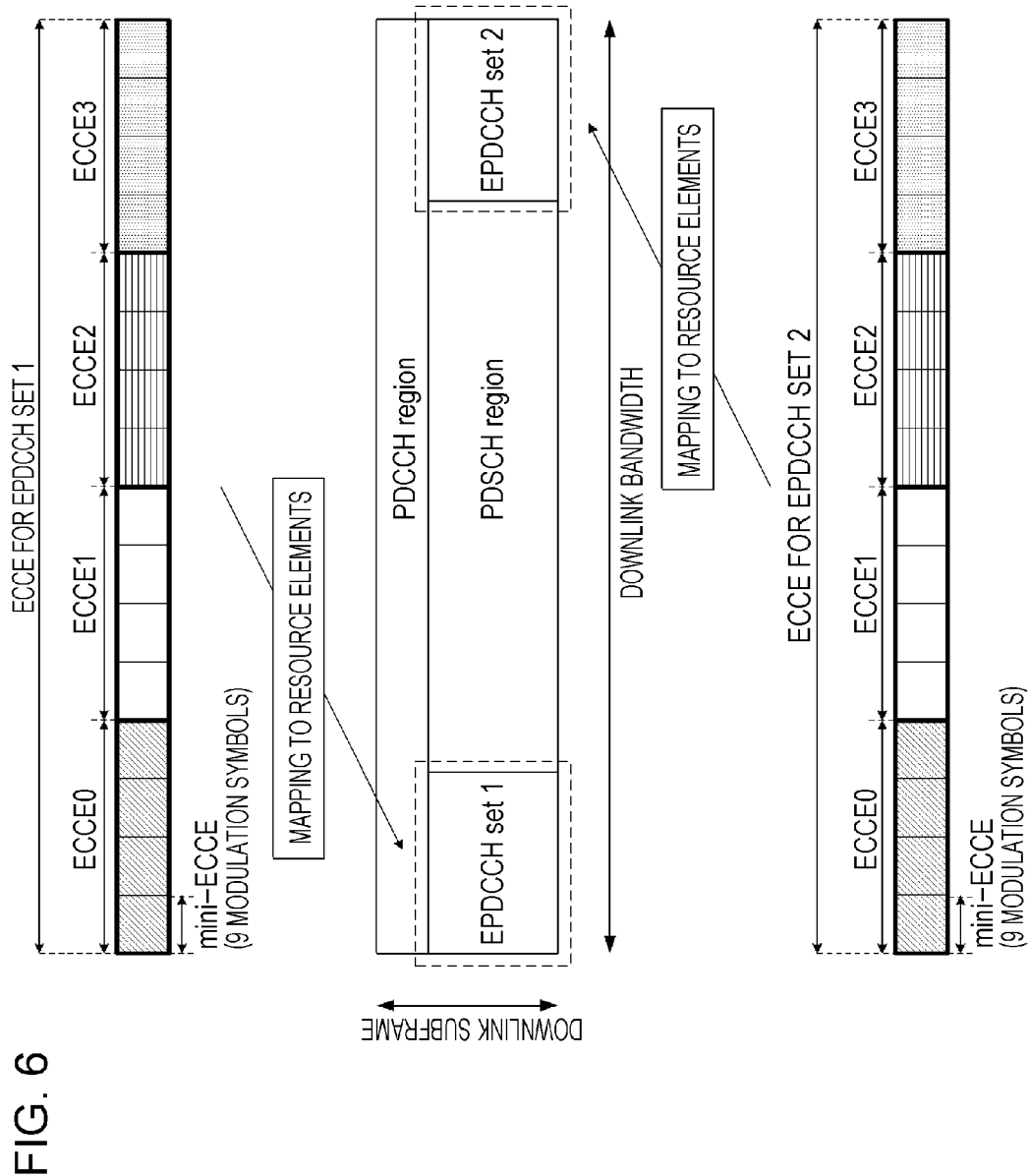
FIG. 6 is a diagram illustrating a method of mapping an EPDCCH according to the present embodiment to a resource element.

FIG. 6 is a diagram illustrating a method of mapping the EPDCCH according to the present embodiment to a resource element. One ECCE is used to transmit multiple modulation symbols (complex-valued symbols). One ECCE is configured from multiple mini-ECCE's. One mini-ECCE is configured from multiple modulation symbols. The base station device 3 maps one mini-ECCE to one enhanced resource element group. Within a subframe, multiple resource elements that construct 2 consecutive physical resource blocks (one physical resource block in the first slot and one physical resource block in the second slot) in the time domain are divided into 16 enhanced resource element groups. One enhanced resource element group is configured from 9 resource elements.

In FIG. 6, ECCE's (an ECCE 0, an ECCE 1, an ECCE 2, and an ECCE 3) for an EPDCCH set 1 are arranged in the resource elements in the EPDCCH set 1. Furthermore, in FIG. 6, ECCE's (an ECCE 0, an ECCE 1, an ECCE 2, and an ECCE 3) for an EPDCCH set 2 are arranged in the resource elements in the EPDCCH set 2. Moreover, ECCE numbers corresponding to each of the EPDCCH sets are assigned starting from 0.

A search space will be described below.

Figure 7:
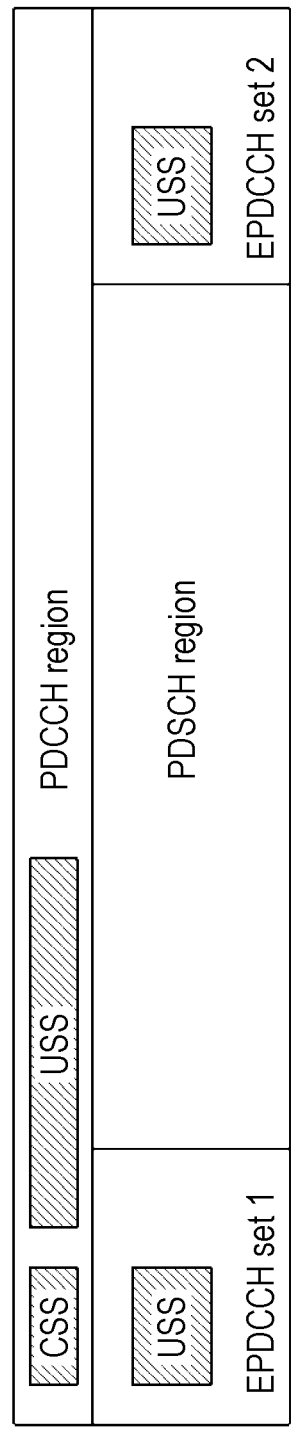
FIG. 7 is a diagram illustrating one example of a configuration of a search space according to the present embodiment.

The search space is configured from a set of PDCCH candidates or from a set of EPDCCH candidates. FIG. 7 is a diagram illustrating one example of a configuration of the search space according to the present embodiment. The PDCCH region is configured to have a common search space (CSS) and a use equipment-specific search space (USS). The secondary cell is not configured to have the CSS. Only the primary cell is configured to have the CSS.

Each of the EPDCCH sets is configured to have the USS. The CSS is defined by resources that are common to multiple mobile station devices 1. The USS is defined independently of each of the mobile station devices 1.

The mobile station device 1 monitors the PDCCH in the CSS in the primary cell.

In a certain serving cell, the mobile station device 1 monitors the PDCCH or the EPDCCH on any one of the USS in the PDCCH region and the USS in the EPDCCH set in a certain subframe. The base station device 3 transmits information that, in every subframe, indicates which one of the USS in the PDCCH region and the USS of the EPDCCH the mobile station device 1 monitors on, to the mobile station device 1. Based on the received information, in a certain subframe, the mobile station device 1 determines whether the PDCCH is monitored on the USS in the PDCCH region and whether the EPDCCH is monitored on the USS in the EPDCCH set. Moreover, in a case where the information is not received, the mobile station device 1 monitors the PDCCH on the USS in the PDCCH region in all subframes.

The transmission mode will be described below.

The base station device 3 configures the mobile station device 1 with the transmission mode through a higher-layer signal. The base station device 3 configures the transmission mode per cell. Based on the received higher-layer signal, the mobile station device 1 is configured with the transmission mode.

Through the higher-layer signal, the mobile station device 1 is configured to receive PDSCH data transmission that is signaled through the PDCCH/EPDCCH, according to one of transmission modes 1 to 10.

Moreover, in a case where the the transmission mode is not configured through the higher-layer signal, the mobile station device 1 is configured with the transmission mode 1 or the transmission mode 2. In a case where a single-antenna port is used for the transmission of the PBCH and the transmission mode is not configured through the higher-layer signal, the mobile station device 1 is configured with the transmission mode 1. In a case where multiple antenna ports are used for the transmission of the PBCH and the transmission mode is not configured through the higher-layer signal, the mobile station device 1 is configured with the transmission mode 2.

In a case where the PDCCH is configured by the higher layer to be decoded, based on each of the combinations defined in FIG. 8, the mobile station device 1 decodes the PDCCH and the PDSCH that corresponds to the PDCCH. For example, the mobile station device 1 that is configured with the transmission mode 7 monitors the PDCCH with a DCI format 1A, on the CSS and the USS, and based on the detected DCI format 1A, receives the PDSCH that is transmitted with a single-antenna port (a port 0) or with a transmit diversity scheme. For example, the mobile station device 1 that is configured with the transmission mode 7 monitors the PDCCH with a DCI format 1, on the CSS, and based on the detected DCI format 1, receives the PDSCH that is transmitted with a single-antenna port (a port 5).

In a case where the EPDCCH is set by the higher layer to be decoded, based on each of the combinations defined in FIG. 9, the mobile station device 1 decodes the EPDCCH and the PDSCH that corresponds to the EPDCCH. For example, the mobile station device 1 that is configured with the transmission mode 7 monitors the EPDCCH that is accompanied by the DCI format 1A, on the USS, and based on the detected DCI format 1A, receives the PDSCH that is transmitted with the single-antenna port (the port 0) or with the transmit diversity scheme. For example, the mobile station device 1 that is configured with the transmission mode 7 monitors the EPDCCH that is accompanied by the DCI format 1, on the USS, and based on the detected DCI format 1, receives the PDSCH that is transmitted with the single-antenna port (the port 5).

The starting position of the OFDM symbol in which the PDSCH is arranged in the first slot in the subframe will be described below.

The "starting position of the OFDM symbol in which the PDCCH is arranged" is also referred to as a "starting position for PDSCH resource mapping" and a "starting position of the resource element/the OFDM symbol to which the PDSCH is mapped."

FIGS. 10 to 20 are diagrams for describing the starting position of the OFDM symbol to which the PDSCH is mapped. The mobile station device 1 and the base station device 3 determine a starting position $1_{DataStart}$ of the OFDM symbol to which the PDSCH is mapped for every cell, based on FIGS. 10 to 20. For example, in a case where the transmission mode 10 is configured and the PDSCH that is scheduled in the DCI format 1A is transmitted and received, the mobile station device 1 and the base station device 3 determine the starting position $1_{DataStart}$ of the OFDM symbol to which the PDSCH for every cell is mapped by using any one example in FIGS. 12 to 16. For example, in a case where the transmission mode 10 is configured and the PDSCH that is scheduled in a DCI format 2D is transmitted and received, the mobile station device 1 and the base station device 3 determine the starting position $1_{DataStart}$ of the OFDM symbol to which the PDSCH for every cell is mapped by using any one example in FIGS. 17 to 20.

The base station device 3 maps the PDSCH, starting from the OFDM symbol of which the starting position is $1=1_{DataStart}$ in the first slot in the subframe. The mobile station device 1 demaps the PDSCH, starting from the OFDM symbol of which the starting position is $1=1_{DataStart}$ in the first slot in the subframe.

FIG. 10 is a diagram for describing the starting position of the OFDM symbol to which the PDSCH for the mobile station device 1 configured with any one of the transmission modes 1 to 9 for a certain cell is mapped.

The mobile station device 1 that is configured with any one of the transmission modes 1 to 9 monitors a DCI format 1, 1A, 1B, 1C, 1D, 2, 2A, 2B, or 2C. The DCI format 1C is used for scheduling and the like of a paging channel (PCH), a random access response, and a system information block. Furthermore, the DCI format 1C is transmitted on the CSS.

In FIG. 10, for the mobile station device 1 that is configured with any one of the transmission modes 1 to 9, in a case where the mobile station device 1 is configured with a carrier indicator field (CIF) for a cell and in a case where, in a different cell, the mobile station device 1 receives the PDSCH and the PDCCH/EPDCCH to which the PDSCH corresponds, $1_{DataStart}$ is given, by a higher-layer parameter pdsch-Start for a cell that receives the PDSCH.

The carrier indicator field is included in the DCI format. A carrier indicator is mapped to the carrier indicator field. The carrier indicator is used to indicate a cell to which the DCI format corresponds.

For every cell, the base station device 3 can configure whether or not the carrier indicator field is included in the DCI format that is transmitted in the cell. For every secondary cell, the base station device 3 can establish configuration for a cell to which the DCI format that is used for the scheduling of the secondary cell is transmitted. The DCI format that is used for the scheduling of the primary cell is necessarily transmitted in the primary cell.

The base station device 3 configures pdsch-Start for every cell that is scheduled by the DCI format of a different cell. Moreover, the configuration of the carrier indicator field and the configuration of pdsch-Start may vary among the mobile station devices 1 that perform communication by using the same cell.

In FIG. 10, for the mobile station device 1 that is configured with any one of the transmission modes 1 to 9, in a case where the mobile station device 1 is not configured with the carrier indicator field for a cell, or in the same cell, the mobile station device 1 receives the PDSCH and the PDCCH/EPDCCH to which the PDSCH corresponds, in a case where the mobile station device 1 detects the DCI format 1, 1A, 1B, 1C, 1D, 2, 2A, 2B, or 2C on the EPDCCH, and in a case where a value of the higher-layer parameter epdcch-Start for the cell is configured by the higher layer, $1_{DataStart}$ is given, by the higher-layer parameter epdcch-Start.

In FIG. 10, for the mobile station device 1 that is configured with any one of the transmission modes 1 to 9 in the case where the mobile station device 1 is not configured with the carrier indicator field for a cell, or in the same cell, the mobile station device 1 receives the PDSCH and the PDCCH/EPDCCH to which the PDSCH corresponds, and in a case where the mobile station device 1 detects the DCI format 1, 1A, 1B, 1C, 1D, 2, 2A, 2B, or 2C on the PDCCH, $1_{DataStart}$ is given, by the span of the DCI that is given by the CFI of the cell.

In FIG. 10, for the mobile station device 1 that is configured with any one of the transmission modes 1 to 9 in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1, 1A, 1B, 1C, 1D, 2, 2A, 2B, or 2C on the EPDCCH, and in a case where the value of the higher-layer parameter epdcch-Start for the cell is not configured by the higher layer, $1_{DataStart}$ is given, by the span of the DCI that is given by the CFI of the cell.

FIG. 11 is a diagram for describing the starting position of the OFDM symbol to which the PDSCH which is scheduled by the DCI format 1C is mapped, for the mobile station device 1 configured with the transmission mode 10 for a certain cell. For the mobile station device 1 that is configured with the transmission mode 10 and that receives the PDSCH that is scheduled in the DCI format 1C, $1_{DataStart}$ is given by the span of the DCI that is given by the CFI of a cell.

FIG. 12 is a diagram for describing a first example of the starting position of the OFDM symbol to which the PDSCH, which is scheduled by the DCI format 1A, for the mobile station device 1 configured with the transmission mode 10 for a certain cell, is mapped.

In FIG. 12, in a case where the mobile station device 1 is configured with the carrier indicator field for a cell, and in the case where, in a different cell, the mobile station device 1 receives the PDSCH and the PDCCH/EPDCCH to which the PDSCH corresponds, $1_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 1A.

In FIG. 12, in a case where the mobile station device 1 is not configured with the carrier indicator field for a cell, or in the same cell, the mobile station device 1 receives the PDSCH and the PDCCH/EPDCCH to which the PDSCH corresponds, in a case where the mobile station device 1 detects the DCI format 1A on the EPDCCH, and in a case where a value of the higher-layer parameter epdcch-Start for a cell is configured by the higher layer, $1_{DataStart}$ is given, by the higher-layer parameter epdcch-Start for the cell or by epdcch-Start for the EPDCCH set in which the EPDCCH is received, to the mobile station device 1 that is configured with the transmission mode 10 and that receives the PDSCH that is scheduled in the DCI format 1A.

In FIG. 12, for the mobile station device 1 that is configured with the transmission mode 10 and that receives the PDSCH that is scheduled in the DCI format 1A, in the case where the mobile station device 1 is not configured with the carrier indicator field for a cell, or in the same cell, the mobile station device 1 receives the PDSCH and the PDCCH/EPDCCH to which the PDSCH corresponds, and in a case where the mobile station device 1 detects the DCI format 1A on the PDCCH, $1_{DataStart}$ is given, by the span of the DCI that is given by the CFI of the cell.

In FIG. 12, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, and in a case where a value of the higher-layer parameter epdcch-Start for a cell is not configured by the higher layer, $1_{DataStart}$ is given, by the span of the DCI that is given by the CFI of the cell, to the mobile station device 1 that is configured with the transmission mode 10 and that receives the PDSCH that is scheduled in the DCI format 1A.

FIG. 13 is a diagram for describing a second example of the starting position of the OFDM symbol to which the PDSCH, which is scheduled by the DCI format 1A, for the mobile station device 1 configured with the transmission mode 10 for a certain cell, is mapped.

In FIG. 13, in a case where the mobile station device 1 is configured with the carrier indicator field for a cell, and in the case where, in a different cell, the mobile station device 1 receives the PDSCH and the PDCCH/EPDCCH to which the PDSCH corresponds, $1_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 1A.

In FIG. 13, in the case where the mobile station device 1 is not configured with the carrier indicator field for a cell, or in the same cell, the mobile station device 1 receives the PDSCH and the PDCCH/EPDCCH to which the PDSCH corresponds, and in a case where a value of the higher-layer parameter, 'PDSCH starting position for PDSCH RE mapping,' for a cell is 0, 1, 2, 3, or 4, $1_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 1A.

In FIG. 13, in the case where the mobile station device 1 is not configured with the carrier indicator field for a cell, or in the same cell, the mobile station device 1 receives the PDSCH and the PDCCH/EPDCCH to which the PDSCH corresponds, and in a case where a value of the higher-layer parameter, 'PDSCH starting position for PDSCH RE mapping,' for a cell is 5, $1_{DataStart}$ is given by the span of the DCI that is given, by the CFI of the cell, to the mobile station device 1 that is configured with the transmission mode 10 and that receives the PDSCH that is scheduled in the DCI format 1A.

A value of 'PDSCH starting position for PDSCH RE mapping' ranges from 0 to 5. The base station device 3 may configure the higher-layer parameter, 'PDSCH starting position for PDSCH RE mapping,' for every cell. In a case where the higher-layer parameter, 'PDSCH starting position for PDSCH RE mapping,' for a cell is not configured by the base station device 3, the mobile station device 1 sets the higher-layer parameter, 'PDSCH starting position for PDSCH RE mapping,' for a cell to 5.

To be more precise, the "case where the value of the higher-layer parameter, 'PDSCH starting position for PDSCH RE mapping,' for a cell is 5" includes a "case where the value of the higher-layer parameter, 'PDSCH starting position for PDSCH RE mapping,' for a cell, is not configured by the higher layer."

Furthermore, the "case where the value of the higher-layer parameter, 'PDSCH starting position for PDSCH RE mapping,' for a cell is 0, 1, 2, 3, or 4," is a "case where the value of the higher-layer parameter, 'PDSCH starting position for PDSCH RE mapping,' for a cell, is configured by the higher layer."

The base station device 3 configures the mobile station device 1 with the higher-layer parameter through the higher-layer signal. The base station device 3 transmits a higher-layer signal indicating a value of the higher-layer parameter to the mobile station device 1. The mobile station device 1 configures the higher-layer parameter based on the received higher-layer signal.

Moreover, a value of epdcch-Start ranges from 0 to 5. In a case where the higher-layer parameter epdcch-Start for a cell is not configured by the base station device 3, the mobile station device 1 may set the higher-layer parameter epdcch-Start for the cell to 5.

To be more precise, the "case where the higher-layer parameter epdcch-Start for a cell is 5" includes a "case where a value of the higher-layer parameter epdcch-Start for a cell is not configured by the higher layer."

Furthermore, the "case where the value of the higher-layer parameter epdcch-Start for a cell is 0, 1, 2, 3, or 4," is a "case where a value of higher-layer parameter epdcch-Start for a cell is configured by the higher layer."

The base station device 3 configures the mobile station device 1 with the higher-layer parameter through the higher-layer signal. The base station device 3 transmits a higher-layer signal indicating the value of the higher-layer parameter to the mobile station device 1. The mobile station device 1 configures the higher-layer parameter based on the received higher-layer signal.

FIG. 14 is a diagram for describing a third example of the starting position of the OFDM symbol to which the PDSCH, which is scheduled by the DCI format 1A, for the mobile station device 1 configured with the transmission mode 10 for a certain cell, is mapped.

In FIG. 14, in a case where the mobile station device 1 is configured with the carrier indicator field for a cell, and in the case where, in a different cell, the mobile station device 1 receives the PDSCH and the PDCCH/EPDCCH to which the PDSCH corresponds, $1_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 1A.

In FIG. 14, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, and in the case where the value of the higher-layer parameter, 'PDSCH starting position for PDSCH RE mapping,' for a cell is 0, 1, 2, 3, or 4, $1_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 1A.

In FIG. 14, in the case where the mobile station device 1 is not configured with the carrier indicator field for a cell, or in the same cell, the mobile station device 1 receives the PDSCH and the PDCCH/EPDCCH to which the PDSCH corresponds, and in a case where the mobile station device 1 detects the DCI format 1A on the PDCCH, $1_{DataStart}$ is given, by the span of the DCI that is given by the CFI of the cell, to the mobile station device 1 that is configured with the transmission mode 10 and that receives the PDSCH that is scheduled in the DCI format 1A.

In FIG. 14, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, and in the case where the value of the higher-layer parameter, 'PDSCH starting position for PDSCH RE mapping,' for a cell, is 5, $1_{DataStart}$ is given, by the span of the DCI that is given by the CFI of the cell, to the mobile station device 1 that is configured with the transmission mode 10 and that receives the PDSCH that is scheduled in the DCI format 1A.

FIG. 15 is a diagram for describing a fourth example of the starting position of the OFDM symbol to which the PDSCH, which is scheduled by the DCI format 1A, for the mobile station device 1 configured with the transmission mode 10 for a certain cell, is mapped.

In FIG. 15, in a case where the mobile station device 1 is configured with the carrier indicator field for a cell, and in the case where, in a different cell, the mobile station device 1 receives the PDSCH and the PDCCH/EPDCCH to which the PDSCH corresponds, $1_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 1A.

In FIG. 15, in the case where the mobile station device 1 is not configured with the carrier indicator field for a cell, or in the same cell, the mobile station device 1 receives the PDSCH and the PDCCH/EPDCCH to which the PDSCH corresponds, in a case where the mobile station device 1 detects the DCI format 1A on the USS, and in the case where the value of the higher-layer parameter, 'PDSCH starting position for PDSCH RE mapping,' for a cell is 0, 1, 2, 3, or 4, $1_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 1A.

In FIG. 15, in the case where the mobile station device 1 is not configured with the carrier indicator field for a cell, or in the same cell, the mobile station device 1 receives the PDSCH and the PDCCH/EPDCCH to which the PDSCH corresponds, and in the case where the mobile station device 1 detects the DCI format 1A on the CSS, $1_{DataStart}$ is given, by the span of the DCI that is given by the CFI of the cell, to the mobile station device 1 that is configured with the transmission mode 10 and that receives the PDSCH that is scheduled in the DCI format 1A.

In FIG. 15, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the USS, and in the case where the value of the higher-layer parameter, 'PDSCH starting position for PDSCH RE mapping,' for a cell, is 5, $1_{DataStart}$ is given, by the span of the DCI that is given by the CFI of the cell, to the mobile station device 1 that is configured with the transmission mode 10 and that receives the PDSCH that is scheduled in the DCI format 1A.

FIG. 16 is a diagram for describing a fifth example of the starting position of the OFDM symbol to which the PDSCH, which is scheduled by the DCI format 1A, for the mobile station device 1 configured with the transmission mode 10 for a certain cell, is mapped.

In FIG. 16, in a case where the mobile station device 1 is configured with the carrier indicator field for a cell, and in the case where, in a different cell, the mobile station device 1 receives the PDSCH and the PDCCH/EPDCCH to which the PDSCH corresponds, $1_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 1A.

In FIG. 16, in the case where the mobile station device 1 is not configured with the carrier indicator field for a cell, or in the same cell, the mobile station device 1 receives the PDSCH and the PDCCH/EPDCCH to which the PDSCH corresponds, and in a case where a value of the higher-layer parameter, 'PDSCH starting position for PDSCH RE mapping,' for a cell is 0, 1, 2, 3, or 4, $1_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 1A.

In FIG. 16, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, in the case where the value of the higher-layer parameter, 'PDSCH starting position for PDSCH RE mapping,' for a cell is 5, and in the case where the value of the higher-layer parameter epdcch-Start for a cell is configured by the higher layer, $1_{DataStart}$ is given, by the higher-layer parameter epdcch-Start for the cell or by epdcch-Start for the EPDCCH set in which the EPDCCH is received, to the mobile station device 1 that is configured with the transmission mode 10 and that receives the PDSCH that is scheduled in the DCI format 1A.

In FIG. 16, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the PDCCH, and in the case where the value of the higher-layer parameter, 'PDSCH starting position for PDSCH RE mapping,' for a cell, is 5, $1_{DataStart}$ is given, by the span of the DCI that is given by the CFI of the cell, to the mobile station device 1 that is configured with the transmission mode 10 and that receives the PDSCH that is scheduled in the DCI format 1A.

In FIG. 16, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, in the case where the value of the higher-layer parameter, 'PDSCH starting position for PDSCH RE mapping,' for a cell, is 5, and in the case where the value of the higher-layer parameter epdcch-Start for a cell is not configured by the higher layer, $1_{DataStart}$ is given, by the span of the DCI that is given by the CFI of the cell, to the mobile station device 1 that is configured with the transmission mode 10 and that receives the PDSCH that is scheduled in the DCI format 1A.

FIG. 17 is a diagram for describing a first example of the starting position of the OFDM symbol to which the PDSCH, which is scheduled by the DCI format 2D, for the mobile station device 1 configured with the transmission mode 10 for a certain cell, is mapped.

For the mobile station device 1, the base station device 3 can configure 4 sets of higher-layer parameters for the DCI format 2D. The set of higher-layer parameters includes at least 'PDSCH starting position for PDSCH RE mapping' and 'MBSFN subframe configuration for PDSCH RE mapping.'

The base station device 3 transmits information indicating one set among the 4 sets of higher-layer parameters to the mobile station device 1. The information indicating one set among the 4 sets of higher-layer parameters is included in the DCI format 2D. To be more precise, 'PDSCH starting position for PDSCH RE mapping' and 'MBSFN subframe configuration for PDSCH RE mapping' are determined from the DCI format 2D.

The PDCCH and the PMCH, or the PDCCH and the PDSCH are mapped to an MBSFN subframe at the same time. It is difficult to map the PMCH and the PDSCH to a multimedia broadcast multicast service over a single Frequency Network (MBSFN) subframe at the same time. In the MBSFN subframe, the span of the DCI is 1 or 2.

'MBSFN subframe configuration for PDSCH RE mapping' is a parameter that is used only for mapping the PDSCH to resource elements. Actually, a higher-layer parameter, 'MBSFN subframe configuration,' which indicates whether or not a subframe is the MBSFN subframe, is defined separately from 'MBSFN subframe configuration for PDSCH RE mapping.'

For example, 'MBSFN subframe configuration' and 'MBSFN subframe configuration for PDSCH RE mapping' are bitmaps, and one bit in the bitmap corresponds to one subframe. The bitmap is periodically used. For example, a subframe to which a bit having a value of 1 corresponds is a subframe that is indicated by 'MBSFN subframe configuration' or 'MBSFN subframe configuration for PDSCH RE mapping.'

A subframe that is indicated by 'MBSFN subframe configuration' is an MBSFN subframe. A subframe that is not indicated by 'MBSFN subframe configuration' is a non-MBSFN subframe.

In a case where 'MBSFN subframe configuration for PDSCH RE mapping' is not configured by the base station device 3, the mobile station device 1 sets a bitmap of 'MBSFN subframe configuration' to 'MBSFN subframe configuration for PDSCH RE mapping.' In a case where 'PDSCH starting position for PDSCH RE mapping' is not configured by the base station device 3, the mobile station device 1 sets 'PDSCH starting position for PDSCH RE mapping' to 5.

In FIG. 17, in a case where a value of 'PDSCH starting position for PDSCH RE mapping,' which is determined from the DCI format 2D for a cell that receives the PDSCH, is 0, 1, 2, 3, or 4, the mobile station device 1 that is configured with the transmission mode 10 and that receives the PDSCH that is scheduled in the DCI format 2D sets $1'_{DataStart}$ to the value of 'PDSCH starting position for PDSCH RE mapping.'

In FIG. 17, in the case where the value of 'PDSCH starting position for PDSCH RE mapping,' which is determined from the DCI format 2D for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, $1'_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 2D.

In FIG. 17, in the case where the value of 'PDSCH starting position for PDSCH RE mapping' that is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, and in the case where the value of the higher-layer parameter epdcch-Start for a cell is configured by the higher layer, $1'_{DataStart}$ is given, by the higher-layer parameter epdcch-Start for the cell or by epdcch-Start for the EPDCCH set in which the EPDCCH is received, to the mobile station device 1 that is configured with the transmission mode 10 and that receives the PDSCH that is scheduled in the DCI format 2D.

In FIG. 17, in the case where the value of 'PDSCH starting position for PDSCH RE mapping' that is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the mobile station device 1 detects the DCI format 2D on the PDCCH, $1'_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 17, in the case where the value of 'PDSCH starting position for PDSCH RE mapping' that is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, and in the case where the value of the higher-layer parameter epdcch-Start for a cell is not configured by the higher layer, $1'_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 17, in a case where a subframe is indicated by 'MBSFN subframe configuration for PDSCH RE mapping' that is determined from the DCI format 2D for a cell that receives the PDSCH, $1_{DataStart}$ is given based on Equation (1). min (X,Y) is a function for outputting the smallest of the values being input (values in parentheses).

$$1_{DataStart} = \min(2, 1'_{DataStart}) \quad \text{[Math 1]}$$

In FIG. 17, in a case other than the case where the subframe is indicated by 'MBSFN subframe configuration for PDSCH RE mapping' that is determined from the DCI format 2D for a cell that receives the PDSCH, $1'_{DataStart}$ is set to a value of $1'_{DataStart}$.

Among 4 higher-layer parameters, 4 items of 'PDSCH starting position for PDSCH RE mapping,' for the DCI format 2D, one parameter may be same as the higher-layer parameter, 'PDSCH starting position for PDSCH RE mapping, for the DCI format 1A. Furthermore, among 4 higher-layer parameters, 4 items of 'PDSCH starting position for PDSCH RE mapping,' for the DCI format 2D, one parameter may be defined independently of the higher-layer parameter, 'PDSCH starting position for PDSCH RE mapping,' for the DCI format 1A.

Moreover, an example in FIG. 17 may be applied to the mobile station device 1 that is configured with the transmission mode 10 and that receives the PDSCH that is scheduled in the DCI format 1A. In this case, the DCI format 1A can be configured with one set of higher-layer parameters. Among 4 sets of higher-layer parameters for the DCI format 2D, one set may be shared as one set for higher-layer parameters for the DCI format 1A. Furthermore, among 4 sets of higher-layer parameters for the DCI format 2D, one set may be defined independently of one set of higher-layer parameters for the DCI format 1A.

FIG. 18 is a diagram for describing a second example of the starting position of the OFDM symbol to which the PDSCH, which is scheduled by the DCI format 2D, for the mobile station device 1 configured with the transmission mode 10 for a certain cell, is mapped.

In FIG. 18, in the case where the value of 'PDSCH starting position for PDSCH RE mapping,' which is determined from the DCI format 2D for a cell that receives the PDSCH, is 0, 1, 2, 3, or 4, the mobile station device 1 that is configured with the transmission mode 10 and that receives the PDSCH that is scheduled in the DCI format 2D sets $1'_{DataStart}$ to the value of 'PDSCH starting position for PDSCH RE mapping.'

In FIG. 18, in the case where the value of 'PDSCH starting position for PDSCH RE mapping,' which is determined from the DCI format 2D for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, $1'_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 2D.

In FIG. 18, in the case where the value of 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the value of the higher-layer parameter, 'PDSCH starting position for PDSCH RE mapping,' for the DCI format 1A, is 0, 1, 2, 3, or 4, $1'_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 2D.

In FIG. 18, in the case where the value of 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the value of the higher-layer parameter, 'PDSCH starting position for PDSCH RE mapping,' for the DCI format 1A, is 5, $1'_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 18, in a case where the PDSCH is scheduled by the DCI format 2D and a subframe is indicated by 'MBSFN subframe configuration for PDSCH RE mapping' that is determined from the DCI format 2D for a cell that receives the PDSCH, and in a case where the PDSCH is scheduled by the DCI format 1A and a subframe is indicated by 'MBSFN subframe configuration for PDSCH RE mapping' for the DCI format 1A for a cell that receives the PDSCH, $1_{DataStart}$ is given based on Equation (1). In FIG. 18, in other cases, $1_{DataStart}$ is set to a value of $1'_{DataStart}$.

In FIG. 18, "other cases" include a "case where the PDSCH is scheduled by the DCI format 2D and a subframe is not indicated by 'MBSFN subframe configuration for PDSCH RE mapping' that is determined from the DCI format 2D for a cell that receives the PDSCH," and a "case where the PDSCH is scheduled by the DCI format 1A and a subframe is not indicated by 'MBSFN subframe configuration for PDSCH RE mapping' for the DCI format 1A for a cell that receives the PDSCH."

FIG. 19 is a diagram for describing a third example of the starting position of the OFDM symbol to which the PDSCH, which is scheduled by the DCI format 2D, for the mobile station device 1 configured with the transmission mode 10 for a certain cell, is mapped.

In FIG. 19, in the case where the value of 'PDSCH starting position for PDSCH RE mapping,' which is determined from the DCI format 2D for a cell that receives the PDSCH, is 0, 1, 2, 3, or 4, the mobile station device 1 that is configured with the transmission mode 10 and that receives the PDSCH that is scheduled in the DCI format 2D sets $1'_{DataStart}$ to the value of 'PDSCH starting position for PDSCH RE mapping.'

In FIG. 19, in the case where the value of 'PDSCH starting position for PDSCH RE mapping,' which is determined from the DCI format 2D for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, $1'_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 2D.

In FIG. 19, in the case where the value of 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, and in the case where the value of the higher-layer parameter, 'PDSCH starting position for PDSCH RE mapping,' for the DCI format 1A, is 0, 1, 2, 3, or 4, $1'_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 2D.

In FIG. 19, in the case where the value of 'PDSCH starting position for PDSCH RE mapping' that is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the mobile station device 1 detects the DCI format 2D on the PDCCH, $1'_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 19, in the case where the value of 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, and in the case where the value of the higher-layer parameter, 'PDSCH starting position for PDSCH RE mapping,' for the DCI format 1A, is 5, $1'_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 19, in a case where the PDSCH is scheduled by the DCI format 2D and a subframe is indicated by 'MBSFN subframe configuration for PDSCH RE mapping' that is determined from the DCI format 2D for a cell that receives the PDSCH, and in a case where the PDSCH is scheduled by the DCI format 1A and a subframe is indicated by 'MBSFN subframe configuration for PDSCH RE mapping' for the DCI format 1A for a cell that receives the PDSCH, $1_{DataStart}$ is given based on Equation (1). In FIG. 19, in other cases, $1_{DataStart}$ is set to a value of $1'_{DataStart}$.

In FIG. 19, "other cases" include a "case where the PDSCH is scheduled by the DCI format 2D and a subframe is not indicated by 'MBSFN subframe configuration for PDSCH RE mapping' that is determined from the DCI format 2D for a cell that receives the PDSCH," and a "case where the PDSCH is scheduled by the DCI format 1A and a subframe is not indicated by 'MBSFN subframe configuration for PDSCH RE mapping' for the DCI format 1A for a cell that receives the PDSCH."

FIG. 20 is a diagram for describing a fourth example of the starting position of the OFDM symbol to which the PDSCH, which is scheduled by the DCI format 2D, for the mobile station device 1 configured with the transmission mode 10 for a certain cell, is mapped.

In FIG. 20, in the case where the value of 'PDSCH starting position for PDSCH RE mapping,' which is determined from the DCI format 2D for a cell that receives the PDSCH, is 0, 1, 2, 3, or 4, the mobile station device 1 that is configured with the transmission mode 10 and that receives the PDSCH that is scheduled in the DCI format 2D sets $1'_{DataStart}$ to the value of 'PDSCH starting position for PDSCH RE mapping.'

In FIG. 20, in the case where the value of 'PDSCH starting position for PDSCH RE mapping,' which is determined from the DCI format 2D for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, $1'_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 2D.

In FIG. 20, in the case where the value of 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the value of the higher-layer parameter, 'PDSCH starting position for PDSCH RE mapping,' for the DCI format 1A, is 0, 1, 2, 3, or 4, $1'_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 2D.

In FIG. 20, in the case where the value of 'PDSCH starting position for PDSCH RE mapping' that is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, in the case where the value of the higher-layer parameter, 'PDSCH starting position for PDSCH RE mapping,' for the DCI format 1A, is 5, and in the case where the value of the higher-layer parameter epdcch-Start for a cell is configured by the higher layer, $1'_{DataStart}$ is given, by the higher-layer parameter epdcch-Start for the cell or by epdcch-Start for the EPDCCH set in which the EPDCCH is received, to the mobile station device 1 that is configured with the transmission mode 10 and that receives the PDSCH that is scheduled in the DCI format 2D.

In FIG. 20, in the case where the value of 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the PDCCH, and in the case where the value of the higher-layer parameter, 'PDSCH starting position for PDSCH RE mapping,' for the DCI format 1A, is 5, 1'$_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 20, in the case where the value of 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, and in the case where the value of the higher-layer parameter, 'PDSCH starting position for PDSCH RE mapping,' for the DCI format 1A, is 5, and the value of the higher-layer parameter epdcch-Start for a cell is not configured by the higher layer, 1'$_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 20, in a case where the PDSCH is scheduled by the DCI format 2D and a subframe is indicated by 'MBSFN subframe configuration for PDSCH RE mapping' that is determined from the DCI format 2D for a cell that receives the PDSCH, and in a case where the PDSCH is scheduled by the DCI format 1A and a subframe is indicated by 'MBSFN subframe configuration for PDSCH RE mapping' for the DCI format 1A for a cell that receives the PDSCH, 1$_{DataStart}$ is given based on Equation (1). In FIG. 20, in other cases, 1$_{DataStart}$ is set to a value of 1'$_{DataStart}$.

In FIG. 20, "other cases" include a "case where the PDSCH is scheduled by the DCI format 2D and a subframe is not indicated by 'MBSFN subframe configuration for PDSCH RE mapping' that is determined from the DCI format 2D for a cell that receives the PDSCH," and a "case where the PDSCH is scheduled by the DCI format 1A and a subframe is not indicated by 'MBSFN subframe configuration for PDSCH RE mapping' for the DCI format 1A for a cell that receives the PDSCH."

Furthermore, in a case where the DCI format 1A is received on the CSS, 1'$_{DataStart}$ is given by the span of the DCI that is given by the CFI of the cell, and in a case where the DCI format 1A/2D is received on the USS, the example in FIG. 17 may be applied.

Furthermore, the starting position of the resource element to which the physical downlink shared channel is mapped in the first slot in a certain subframe may be determined based on the antenna port that is used for the transmission of the PDSCH.

Antenna ports 0 to 3 are used for the transmission of a cell-specific reference signal (CRS). The CRS's are arranged in a state of being distributed over the whole cell area.

An antenna port 7 is used for transmission of a UE-specific reference signal (URS). The URS's are arranged in a state of being distributed within the physical resource block in which the PDSCH is arranged.

In the MBSFN subframe, the PDSCH that is scheduled in the DCI format 1A is transmitted in the antenna port 7. In the non-MBSFN subframe, the PDSCH that is scheduled in the DCI format 1A detected on the CSS is transmitted in the antenna ports 0 to 3.

In the non-MBSFN subframe, the PDSCH that is scheduled in the DCI format 1A that is detected on the USS may be transmitted in the antenna ports 0 to 3. In the non-MBSFN subframe, the PDSCH that is scheduled in the DCI format 1A that is detected on the USS may be transmitted in the antenna port 7.

For example, in a case where the antenna ports 0 to 3 are used for the transmission of the PDSCH, 1$_{DataStart}$ is given, by the span of the DCI that is given by the CFI of a cell, to the mobile station device 1 that is configured with the transmission mode 10 and that receives the PDSCH that is scheduled in the DCI format 1A.

For example, in a case where the antenna port 7 is used for the transmission of the PDSCH, 1$_{DataStart}$ is given, based on examples in FIGS. 12 to 16, to the mobile station device 1 that is configured with the transmission mode 10 and that receives the PDSCH that is scheduled in the DCI format 1A.

FIG. 21 is a diagram for describing a sixth example of the starting position of the OFDM symbol to which the PDSCH, which is scheduled by the DCI format 1A, for the mobile station device 1 configured with the transmission mode 10 for a certain cell, is mapped.

For example, in FIG. 21, in the case where the antenna ports 0 to 3 are used for the transmission of the PDSCH, 1$_{DataStart}$ is given, by the span of the DCI that is given by the CFI of a cell, to the mobile station device 1 that is configured with the transmission mode 10 and that receives the PDSCH that is scheduled in the DCI format 2D.

In FIG. 21, in the mobile station device 1 that is configured with the transmission mode 10 and that receives the PDSCH that is scheduled in the DCI format 2D, in the case where the antenna port 7 is used for the transmission of the PDSCH, and in the case where the value of 'PDSCH starting position for PDSCH RE mapping,' which corresponds to the DCI format 1A for a cell that receives the PDSCH, is 0, 1, 2, 3, or 4, 1'$_{DataStart}$ is set to the value of 'PDSCH starting position for PDSCH RE mapping.'

In FIG. 21, in the case where the antenna port 7 is used for the transmission of the PDSCH, in the case where the value of 'PDSCH starting position for PDSCH RE mapping,' which corresponds to the DCI format 1A for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, 1'$_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 2D.

In FIG. 21, in the case where the antenna port 7 is used for the transmission of the PDSCH, in the case where the value of 'PDSCH starting position for PDSCH RE mapping,' which corresponds to the DCI format 1A for a cell that receives the PDSCH, is 5, and in the case where the mobile station device 1 is not configured with the carrier indicator field for a cell, or in the same cell, the mobile station device 1 receives the PDSCH and the PDCCH/EPDCCH to which the PDSCH corresponds, 1'$_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 21, in a case where a subframe is indicated by 'MBSFN subframe configuration for PDSCH RE mapping' that corresponds to the DCI format 1A for a cell that receives the PDSCH, 1$_{DataStart}$ is given based on Equation (1). In FIG. 21, in other cases, 1$_{DataStart}$ is set to the value of 1'$_{DataStart}$.

"Other cases" include a "case where a subframe is not indicated by 'MBSFN subframe configuration for PDSCH Re mapping' that corresponds to the DCI format 1A for a cell that receives the PDSCH."

FIG. 22 is a diagram for describing a seventh example of the starting position of the OFDM symbol to which the PDSCH, which is scheduled by the DCI format 1A, for the mobile station device 1 configured with the transmission mode 10 for a certain cell, is mapped.

For example, in FIG. 22, in the case where the antenna ports 0 to 3 are used for the transmission of the PDSCH, $1_{DataStart}$ may be given, by the span of the DCI that is given by the CFI of a cell, to the mobile station device 1 that is configured with the transmission mode 10 and that receives the PDSCH that is scheduled in the DCI format 1A.

In FIG. 22, for the mobile station device 1 that is configured with the transmission mode 10 and that receives the PDSCH that is scheduled in the DCI format 1A, in the case where the antenna port 7 is used for the transmission of the PDSCH, and in the case where the value of 'PDSCH starting position for PDSCH RE mapping,' which corresponds to the DCI format 1A for a cell that receives the PDSCH, is 0, 1, 2, 3, or 4, $1'_{DataStart}$ is set to the value of 'PDSCH starting position for PDSCH RE mapping.'

In FIG. 22, for the mobile station device 1 that is configured with the transmission mode 10 and that receives the PDSCH that is scheduled in the DCI format 1A, in the case where the antenna port 7 is used for the transmission of the PDSCH, in the case where the value of 'PDSCH starting position for PDSCH RE mapping,' which corresponds to the DCI format 1A for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, $1'_{DataStart}$ is given, by the higher-layer parameter pdsch-Start for a cell that receives the PDSCH.

In FIG. 22, for the mobile station device 1 that is configured with the transmission mode 10 and that receives the PDSCH that is scheduled in the DCI format 1A, in the case where the antenna port 7 is used for the transmission of the PDSCH, in the case where the value of 'PDSCH starting position for PDSCH RE mapping' that corresponds to the DCI format 1A for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, and in the case where the value of the higher-layer parameter epdcch-Start for a cell is configured by the higher layer, $1'_{DataStart}$ is given, by the higher-layer parameter epdcch-Start for the cell or by epdcch-Start for the EPDCCH set in which the EPDCCH is received.

In FIG. 22, for the mobile station device 1 that is configured with the transmission mode 10 and that receives the PDSCH that is scheduled in the DCI format 1A, in the case where the antenna port 7 is used for the transmission of the PDSCH, in the case where the value of 'PDSCH starting position for PDSCH RE mapping,' which corresponds to the DCI format 1A for a cell that receives the PDSCH, is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the mobile station device 1 detects the DCI format 1A on the PDCCH, $1'_{DataStart}$ is given, by the span of the DCI that is given by the CFI of the cell.

In FIG. 22, for the mobile station device 1 that is configured with the transmission mode 10 and that receives the PDSCH that is scheduled in the DCI format 1A, in the case where the antenna port 7 is used for the transmission of the PDSCH, in the case where the value of 'PDSCH starting position for PDSCH RE mapping' that corresponds to the DCI format 1A for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, and in the case where the value of the higher-layer parameter epdcch-Start for a cell is not configured by the higher layer, $1'_{DataStart}$ is given, by the span of the DCI that is given by the CFI of the cell.

In FIG. 22, in the case where a subframe is indicated by 'MBSFN subframe configuration for PDSCH RE mapping' that corresponds to the DCI format 1A for a cell that receives the PDSCH, $1_{DataStart}$ is given based on Equation (1). In FIG. 22, in other cases, $1_{DataStart}$ is set to the value of $1'_{DataStart}$.

"Other cases" include the "case where a subframe is not indicated by 'MBSFN subframe configuration for PDSCH Re mapping' that corresponds to the DCI format 1A for a cell that receives the PDSCH."

A device configuration according to the present embodiment will be described below.

Figure 23:
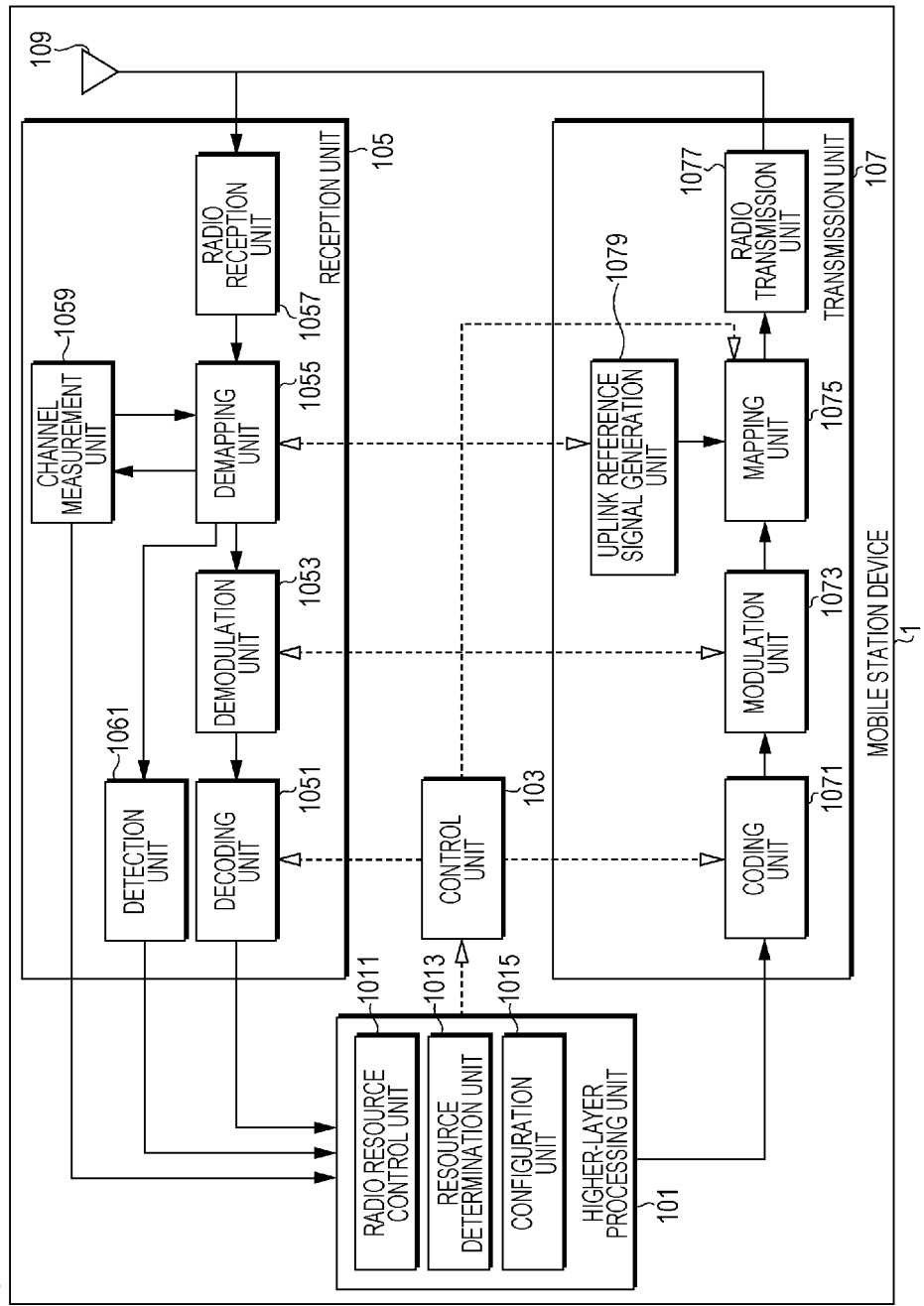
FIG. 23 is a schematic block diagram illustrating a configuration of the mobile station device 1 according to the present embodiment.

FIG. 23 is a schematic block diagram illustrating a configuration of the mobile station device 1 according to the present invention. As illustrated, the mobile station device 1 is configured to include a higher-layer processing unit 101, a control unit 103, a reception unit 105, a transmission unit 107, and a transmit and receive antenna 109. Furthermore, the higher-layer processing unit 101 is configured to include a radio resource control unit 1011, a resource determination unit 1013, and a configuration unit 1015. Furthermore, the reception unit 105 is configured to include a decoding unit 1051, a demodulation unit 1053, a demapping unit 1055, a radio reception unit 1057, a channel measurement unit 1059, and a detection unit 1061. Furthermore, the transmission unit 107 is configured to include a coding unit 1071, a modulation unit 1073, a mapping unit 1075, a radio transmission unit 1077, and an uplink reference signal generation unit 1079.

The higher-layer processing unit 101 outputs uplink data (transport block) generated by a user operation and the like, to the transmission unit 107. Furthermore, the higher-layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the radio resource control unit 1011 generates information that is arranged in each channel for uplink, and outputs the generated information to the transmission unit 107.

The resource determination unit 1013 that is included in the higher-layer processing unit 101 determines resource elements on which the downlink physical channel and the downlink physical signal are demapped. The resource determination unit 1013 instructs the demapping unit 1055 to de-map (extract) the downlink physical channel and the downlink physical signal from the downlink resource elements through the control unit 103. For example, the resource determination unit 1013 determines the resource elements from which the PDSCH is de-mapped, by using any of the examples in FIGS. 10 to 22.

Furthermore, the resource determination unit 1013 determines the resource elements to which the uplink physical channel and the uplink physical signal are mapped. The resource determination unit 1013 instructs the mapping unit 1075 to map the uplink physical channel and the uplink physical signal to uplink resource elements through the control unit 103.

The configuration unit 1015 that is included in the higher-layer processing unit 101 manages various pieces of configuration information of the mobile station device 1 itself. For example, the configuration unit 1015 performs various configurations according to the higher-layer signal received from the base station device 3.

The control unit 103 generates a control signal for performing control of the reception unit 105 and of the transmission unit 107, based on control information from the higher-layer processing unit 101. The control unit 103 outputs the generated control signal to the reception unit 105 and the transmission unit 107, and performs control of the reception unit 105 and of the transmission unit 107.

In accordance with a control signal that is input from the control unit 103, the reception unit 105 separates, demodulates, and decodes a received signal that is received from the base station device 3 through the transmit and receive antenna 109, and outputs the resulting information to the higher-layer processing unit 101.

The radio reception unit 1057 converts (down-converts) a downlink signal received through the transmit and receive antenna 109 into an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio reception unit 1057 removes a portion equivalent to a guide interval (GI) from the digital signal that results from the conversion, performs Fast Fourier Transform (FFT) on the signal from which the guide interval is removed, and extracts a signal in the frequency domain.

The demapping unit 1055 separates the extracted signal into the PHICH, the PDCCH, the EPDCCH, the PDSCH, and the downlink reference signal. Furthermore, the demapping unit 1055 makes an adjustment of channels, the PHICH, the PDCCH, the EPDCCH, and the PDSCH, from a channel estimate being input from the channel measurement unit 1059. Furthermore, the demapping unit 1055 outputs the separated downlink reference signals that result from the separation to the channel measurement unit 1059.

The demodulation unit 1053 multiplies the PHICH by a corresponding code for composition, performs demodulation in compliance with the Binary Phase Shift Keying (BPSK) modulation scheme on the resulting composite signal, and outputs a result of the demodulation to the decoding unit 1051. The decoding unit 1051 decodes the PHICH destined for the mobile station device 1 itself, and outputs the HARQ indicator that results from the decoding to the higher-layer processing unit 101.

The demodulation unit 1053 performs demodulation on the PDSCH in compliance with the modulation scheme notified with the downlink grant, such as Quadrature Phase Shift keying (QPSK), 16 Quadrature Amplitude Modulation (QAM), or 64 QAM, and outputs a result of the demodulation to the decoding unit 1051. The decoding unit 1051 performs the decoding based on information relating to a coding rate that is notified with the downlink control information, and outputs to the higher-layer processing unit 101 the downlink data (transport block) that results from the decoding.

The channel measurement unit 1059 measures a downlink path loss or a channel state from the downlink reference signal being input from the demapping unit 1055, and outputs the measured path loss or channel state to the higher-layer processing unit 101. Furthermore, the channel measurement unit 1059 calculates a downlink channel estimate from the downlink reference signal and outputs the calculated downlink channel estimate to the demapping unit 1055.

The detection unit 1061 performs detection of the downlink control information with the PDCCH and/or the EPDCCH, and outputs the detected downlink control information to the higher-layer processing unit 101. The detection unit 1061 performs demodulation in compliance with the QPSK modulation scheme and decoding on the PDCCH and/or the EPDCCH. The detection unit 1061 attempts to perform blind decoding of the PDCCH and/or the EPDCCH. In a case where the blind decoding succeeds, the detection unit 1061 outputs the downlink control information to the higher-layer processing unit 101.

The transmission unit 107 generates the uplink reference signal in accordance with the control signal being input from the control unit 103, performs the coding and the modulation on the uplink data (the transport block) being input from the higher-layer processing unit 101, multiplexes the PUCCH, the PUSCH, and the generated uplink reference signal, and transmits a result of the multiplexing to the base station device 3 through the transmit and receive antenna 109.

The coding unit 1071 performs the coding, such as convolutional coding and block coding, on the uplink control information being input from the higher-layer processing unit 101. Furthermore, the coding unit 1071 performs turbo coding, based on information that is used for the scheduling of PUSCH.

The modulation unit 1073 performs the modulation on coded bits being input from the coding unit 1071, in compliance with the modulation scheme notified with the downlink control information, such as BPSK, QPSK, 16 QAM, or 64 QAM, or the modulation scheme that is prescribed in advance on every channel. Based on the information that is used for the scheduling of the PUSCH, the modulation unit 1073 determines the number of sequences of pieces of data that are space-multiplexed, maps multiple pieces of uplink data that are transmitted on the same PUSCH, to multiple sequences, by using Multiple Input Multiple Output Spatial Multiplexing (MIMO SM), and performs precoding on the sequences. The modulation unit 1073 spreads the PUCCH by using the cyclic shift and/or the orthogonal sequence.

The uplink reference signal generation unit 1079 generates a reference signal sequence based on the physical layer cell identity (PCI) and the virtual cell identity for identifying the base station device 3.

In accordance with the control signal being input from the control unit 103, the mapping unit 1075 rearranges modulation symbols of the PUSCH in parallel and then performs Discrete Fourier Transform (DFT) on the rearranged modulation symbols. Furthermore, the mapping unit 1075 multiplexes PUCCH and PUSCH signals and the generated uplink reference signal for each transmit antenna port. To be more precise, the mapping unit 1075 arranges (maps) the PUCCH and PUSCH signals and the generated uplink reference signal in the resource elements for each transmit antenna port.

The radio transmission unit 1077 performs Inverse Fast Fourier Transform (IFFT) on the multiplexed signal, performs the modulation in compliance with an SC-FDMA scheme, adds the guide interval to the SC-FDMA-modulated SC-FDMA symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a high frequency signal, removes unnecessary frequency components, performs power amplification, and outputs a final result to the transmit and receive antenna 109 for transmission.

Figure 24:
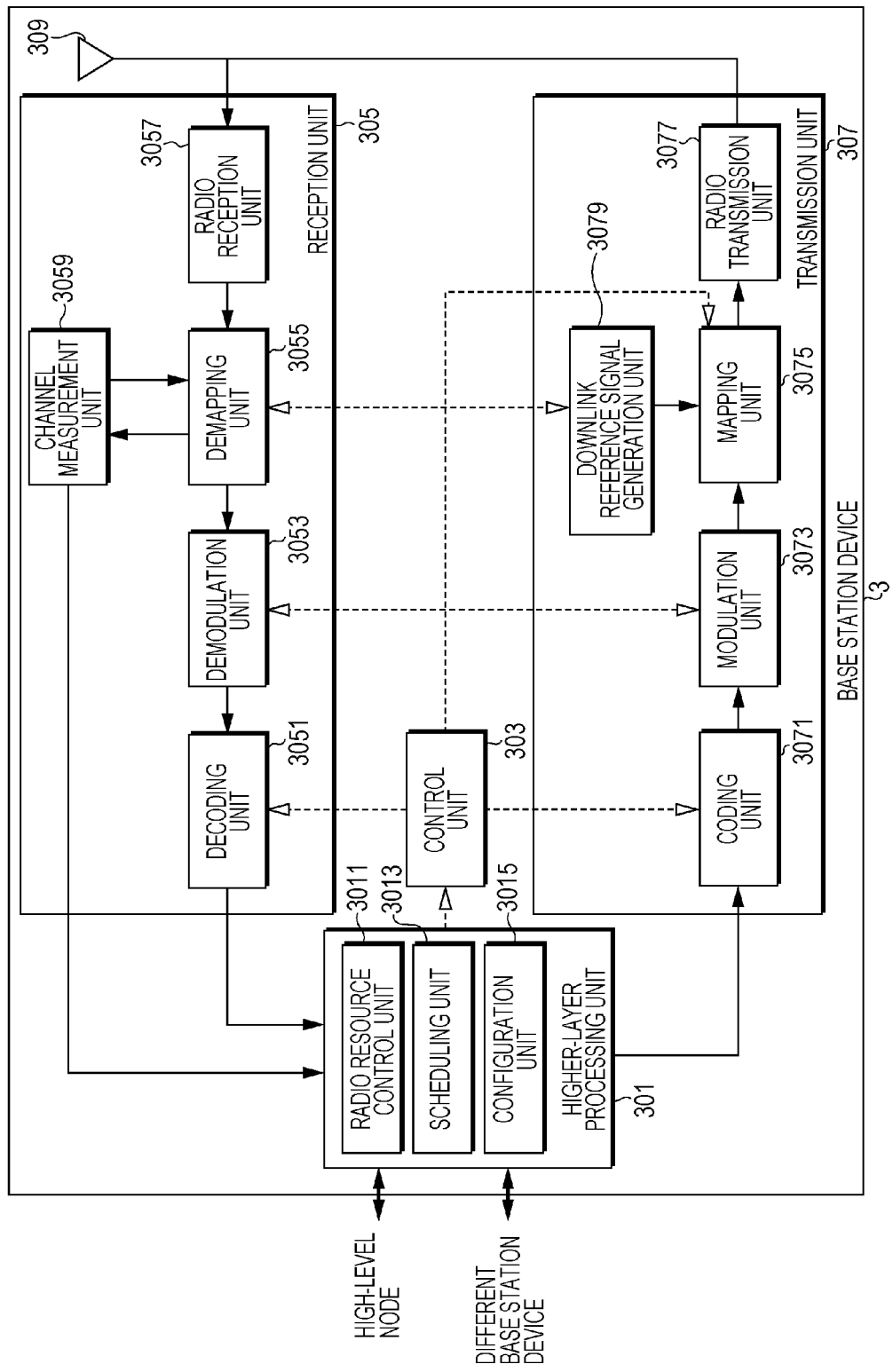
FIG. 24 is a schematic block diagram illustrating a configuration of the base station device 3 according to the present embodiment.

FIG. 24 is a schematic block diagram illustrating a configuration of the base station device 3 according to the present embodiment. As is illustrated, the base station device 3 is configured to include a higher-layer processing unit 301, a control unit 303, a reception unit 305, a transmission unit 307, and a transmit and receive antenna 309. Furthermore, the higher-layer processing unit 301 is configured to include a radio resource control unit 3011, a scheduling unit 3013, and a configuration unit 3015. Furthermore, the reception unit 305 is configured to include a decoding unit 3051, a demodulation unit 3053, a demapping unit 3055, a radio reception unit 3057, and a channel measurement unit 3059. Furthermore, the transmission unit 307 is configured to include a coding unit 3071, a modulation unit 3073, a mapping unit 3075, a radio transmission unit 3077, and a downlink reference signal generation unit 3079.

The higher-layer processing unit 301 performs the processing of the Medium Access Control (MAC) layer, the packet data convergence Protocol (PDCH) layer, the radio link control (RLC) layer, the radio resource control (RLC) layer, and the radio resource control (RRC) layer. Furthermore, the higher-layer processing unit 301 generates control information for performing control of the reception unit 305 and of the transmission unit 307 and outputs the generated control information to the control unit 303.

The radio resource control unit 3011 that is included in the higher-layer processing unit 301 generates, or acquires from a higher-level node, downlink data (a transport block) that is arranged in the downlink PDSCH, a system information block, an RRC signal, the MAC control element (CE), and the like, and outputs a result of the generation or of the acquirement to the transmission unit 307. Furthermore, the radio resource control unit 3011 manages various pieces of configuration information on each of the mobile station devices 1.

The scheduling unit 3013 that is included in the higher-layer processing unit 301 determines a frequency and a subframe and resource elements to which the physical channel (the PDSCH and the PUSCH) is assigned, a coding rate and a modulation scheme of the physical channel (the PDSCH and the PUSCH), transmission power, and the like, from a channel estimate, channel quality, or the like that is input from the channel measurement unit 3059. The scheduling unit 3013 generates the control information in order to perform the control of the reception unit 305 and of the transmission unit 307 based on a result of the scheduling, and outputs the generated information to the control unit 303. Furthermore, the scheduling unit 3013 outputs a result of the scheduling of the physical channel (the PDSCH and the PUSCH) to a control information generation unit 3015.

The scheduling unit 3013 instructs the mapping unit 3075 to map the downlink physical channel and the downlink physical signal to downlink resource elements through the control unit 103. For example, the scheduling unit 3013 determines the resource elements to which the PDSCH is mapped, by using any of the examples in FIGS. 10 to 22.

The control unit 303 generates a control signal for performing control of the reception unit 305 and of the transmission unit 307, based on control information from the higher-layer processing unit 301. The control unit 303 outputs the generated control signal to the reception unit 305 and the transmission unit 307, and performs control of the reception unit 305 and of the transmission unit 307.

In accordance with the control signal that is input from the control unit 303, the reception unit 305 separates, demodulates, and decodes a received signal that is received from the mobile station device 1 through the transmit and receive antenna 309, and outputs the resulting information to the higher-layer processing unit 301. The radio reception unit 3057 converts (down-converts) an uplink signal received through the transmit and receive antenna 309 into an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 3057 removes a portion corresponding to the guide interval (GI) from the digital signal that results from the conversion. The radio reception unit 3057 performs Fast Fourier Transform (FFT) on the signal from which the guide interval is removed, extracts the signal in the frequency domain, and outputs the resulting signal to the demapping unit 3055.

The demapping unit 3055 separates the signal being input from the radio reception unit 3057 into PUCCH, PUSCH, and the signal such as the uplink reference signal. Moreover, the separation is performed based on radio resource allocation information that is determined in advance in the radio resource control unit 3011 by the base station device 3, and that is included in the uplink grant notified to each mobile station device 1. Furthermore, the demapping unit 3055 makes an adjustment of channels, the PUCCH and the PUSCH, from the channel estimate being input from the channel measurement unit 3059. Furthermore, the demapping unit 3055 outputs the separated uplink reference signal to the channel measurement unit 3059.

The demodulation unit 3053 performs Inverse Discrete Fourier Transform (IDFT) on the PUSCH, acquires the modulation symbol, and performs the demodulation of the received signal with respect to each of the modulation symbols of the PUCCH and the PUSCH, by using the modulation scheme prescribed in advance, such as Binary Phase Shift Keying (BPSK), QPSK, 16 QAM, or 64 QAM, or the modulation scheme that the base station device 3 itself notifies, in advance with the uplink grant, to each of the mobile station devices 1. The demodulation unit 3053 separates the modulation symbol of the multiple pieces of uplink data that are transmitted on the same PUSCH by using MIMO SM, based on the number of space-multiplexed sequences that is notified in advance with the uplink grant to each of the mobile station devices 1 and on information indicating the precoding that is performed on the sequences.

The decoding unit 3051 performs the decoding on the demodulated coded bits of the PUCCH and the PUSCH at the coding rate in compliance with a coding scheme prescribed in advance, which is prescribed in advance, or is notified in advance with the uplink grant to the mobile station device 1 by the base station device 3 itself, and outputs uplink data and the uplink control information that are decoded to the higher-layer processing unit 301. In a case where the PUSCH is retransmitted, the decoding unit 3051 performs the decoding by using the coded bits that are input from the higher-layer processing unit 301 and that are retained in a HARQ buffer, and the demodulated coded bits. The channel measurement unit 309 measures the channel estimate, the channel quality, and the like, based on the uplink reference signal being input from the demapping unit 3055, and outputs a result of the measurement to the demapping unit 3055 and the higher-layer processing unit 301.

The transmission unit 307 generates the downlink reference signal in accordance with the control signal being input from the control unit 303, codes and modulates the HARQ indicator, the downlink control information, and the downlink data that are input from the higher-layer processing unit 301, multiplexes the PHICH, the PDCCH, the EPDCCH, the PDSCH, and the downlink reference signal, and transmits a result of the multiplexing to the mobile station device 1 through the transmit and receive antenna 309.

The coding unit 3071 performs the coding on the HARQ indicator, the downlink control information, and the downlink data that are input from the higher-layer processing unit 301. When performing the coding, the coding unit 3071 uses the coding scheme that is prescribed in advance, such as block coding, convolutional coding, or turbo coding, or a coding scheme that is determined by the radio resource control unit 3011. The modulation unit 3073 performs the modulation on the coded bits being input from the coding unit 3071. When performing the modulation, the modulation unit 3073 uses the modulation scheme that is prescribed in advance, such as BPSK, QPSK, 16 QAM, or 64 QAM, or the modulation scheme that is determined by the radio resource control unit 3011.

The downlink reference signal generation unit 3079 generates as the downlink reference signal a sequence that is already known to the mobile station device 1, which is acquired according to a predetermined rule that is determined in advance based on the physical cell identity (PCI) for identifying the base station device 3, and the like. The mapping unit 3075 multiplexes the modulated modulation symbol of each channel and the generated downlink reference signal. To be more precise, the mapping unit 3075 arranges the modulated modulation symbol of each channel and the generated downlink reference signal in the resource elements.

The radio transmission unit 3077 performs Inverse Fast Fourier Transform (IFFT) on the multiplexed modulation symbol, performs the modulation in compliance with an OFDM scheme, adds the guide interval to the OFDM-modulated OFDM symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a high frequency signal, removes unnecessary frequency components, performs power amplification, and outputs a final result to the transmit and receive antenna 309 for transmission.

As described above, the mobile station device 1 and the base station device 3 according to the present embodiment determine the starting position of the resource element to which the PDSCH is mapped in the first slot in a certain subframe, based on at least one of the transmission mode for the transmission on the PDSCH, the DCI format that is used for scheduling of the PDSCH, the downlink physical channel that is used for the transmission of the PDSCH, the search space on which the DCI format is detected, and the antenna port that is used for the transmission of the PDSCH.

Furthermore, an operation relating to the reception of the PDSCH can also be changed in either of a case where a normal dynamic scheduling (scheduling by the DCI format (for example, the DCI format that is transmitted on the PDCCH or the EPDCCH and to which CRC parity bits scrambled with C-RNTI are attached) that is masked with a normal terminal identifier, scheduling by which the DCI format that performs triggering and the PDSCH that is triggered are arranged in one subframe) is performed and a case where a semi persistent scheduling (scheduling by the DCI format (for example, the DCI format that is transmitted on the PDCCH or the EPDCCH and to which the CRS parity bits scrambled by SPS C-RNTI are added) that is masked with a terminal identifier for a semi persistent scheduling, scheduling by which the PDSCH in multiple subframes can be triggered by the DCI format in one subframe) is performed.

(A) The terminal device according to the present embodiment determines the starting position of the resource element to which the physical downlink shared channel is mapped in the first slot in a certain subframe based on at least one of the transmission mode for the transmission on the physical downlink shared channel, the downlink control information format used for the scheduling of the physical downlink shared channel, the downlink physical channel used for the transmission of the downlink control information format, and the search space on which the downlink control information format is detected.

(B) In the terminal device described above, the starting position of the resource element to which the physical downlink shared channel is mapped is determined based on the parameter, with which the configuration is established by the higher layer.

(C) In the terminal device described above, the starting position of the resource element to which the physical downlink shared channel is mapped is determined based on information that is transmitted on a physical control format indicator channel.

(D) In the terminal device described above, the starting position of the resource element to which the physical downlink shared channel is mapped is determined based on control information that is included in the downlink control information format.

(E) In the terminal device described above, the downlink physical channel used for the transmission of the downlink control information format is a physical downlink control channel or an enhanced physical downlink control channel.

(F) In the terminal device described above, the search space on which the downlink control information format is detected is a common search space or a user equipment-specific search space.

(G) The base station device according to the present embodiment arranges the physical downlink shared channel in the resource elements, starting from the starting position that is determined based on at least one of the transmission mode for the transmission on the physical downlink shared channel, the downlink control information format used for the scheduling of the physical downlink shared channel, the downlink physical channel used for the transmission of the downlink control information format, and the search space on which the terminal device detects the downlink control information format, in a first slot in a certain subframe.

(H) In the base station device described above, the starting position of the resource element to which the physical downlink shared channel is mapped is determined based on the parameter, with which the configuration is established by the higher layer.

(I) In the base station device described above, the starting position of the resource element to which the physical downlink shared channel is mapped is determined based on information that is transmitted on the physical control format indicator channel.

(J) In the base station device described above, the starting position of the resource element to which the physical downlink shared channel is mapped is determined based on the control information that is included in the downlink control information format.

(K) In the base station device described above, the downlink physical channel used for the transmission of the downlink control information format is the physical downlink control channel or the enhanced physical downlink control channel.

(L) In the base station device described above, the search space on which the downlink control information format is detected is the common search space or the user equipment-specific search space.

Accordingly, the base station device 3 and the terminal device 1 can determine the starting position of the resource element to which the PDSCH is mapped and can efficiently perform communication.

A program running on the base station device 3 and the mobile station device 1 according to the present invention may be a program (a program for causing a computer to operate) that controls a central processing unit (CPU) and the like in such a manner as to realize the functions according to the embodiments of the present invention, which are described above. Then, the information that is handled in these apparatuses is temporarily stored in a Random Access Memory (RAM) while being processed. Thereafter, the information is stored in various types of ROM such as a Flash Read Only Memory (ROM) or a Hard Disk Drive (HDD) and, whenever necessary, is read by the CPU to be modified or rewritten.

Moreover, one portion of each of the mobile station device 1 and the base station device 3 according to the embodiments, which are described above, may be realized by the computer. In that case, this one portion may be realized by recording a program for realizing such control functions on a computer-readable recording medium and causing a computer system to read the program stored on the recording medium for execution.

Moreover, the "computer system" here is defined as a computer system built into the mobile station device 1 or the base station device 3 and as including an OS or hardware components such as a peripheral device. Furthermore, the "computer-readable recording medium" refers to a portable medium such as a flexible disk, a magneto-optical disk, a ROM, and a CD-ROM, and a storage device such as a hard disk that is built into the computer system.

Moreover, the "computer-readable recording media" may include a medium that dynamically retains the program for a short period of time, such as a communication line that is used when transmitting the program over a network such as the Internet or over a communication circuit such as a telephone circuit and a medium that retains the program for a fixed period of time, such as a volatile memory within the computer system, which functions as a server or a client in a case of including the program dynamically. Furthermore, the program may be one for realizing some of the functions described above and additionally may be one that can realize the functions described above in combination with a program that is already recorded on the computer system.

Furthermore, the base station device 3 according to the embodiments, which are described above, can be realized as an aggregation (a device group) that is configured from multiple devices. Each device that makes up the device group may be equipped with some portion of or all portions of each function or each functional block of the base station device 3 according to the embodiment, which is described. The device group itself may have each general function or each general functional block of the base station device 3. Furthermore, the mobile station device 1 according to the embodiments, which are described, can also communicate with the base station device as the aggregation.

Furthermore, some portions of or all portions of each of the mobile station device 1 and the base station device 3 according to the embodiment, which are described, may be realized as an LSI that is a typical integrated circuit and may be realized as a chip set. Each functional block of each of the mobile station device 1 and the base station device 3 may be individually realized as a chip, and some of, or all of the functional blocks may be integrated into a chip. Furthermore, a circuit integration technique is not limited to the LSI, and an integrated circuit for the functional block may be realized with a dedicated circuit or a general-purpose processor. Furthermore, if with advances in a semiconductor technology, a circuit integration technology with which an LSI is replaced appears, it is also possible to use an integrated circuit to which such a technology is applied.

Furthermore, according to the embodiments, as described above, the mobile station device is described as one example of a terminal device or a communication device, but the present invention is not limited to this, and can be applied also to a terminal apparatus or a communication apparatus, such as a fixed-type electronic apparatus that is installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention are described in detail above referring to the drawings, but the specific configuration is not limited to the embodiments and includes an amendment to a design that falls within a scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the constituent element that is described according to each of the embodiments is also included in the technical scope of the present invention.

INDUSTRIAL APPLICABILITY

It is possible to apply the present disclosure to a mobile phone, a personal computer, a tablet-type computer or the like.

DESCRIPTION OF REFERENCE NUMERALS 1 (1A, 1B, 1C) MOBILE STATION DEVICE
3 BASE STATION DEVICE
101 HIGHER-LAYER PROCESSING UNIT

103 CONTROL UNIT
105 RECEPTION UNIT
107 TRANSMISSION UNIT
109 TRANSMIT AND RECEIVE ANTENNA
1011 RADIO RESOURCE CONTROL UNIT
1013 RESOURCE DETERMINATION UNIT
1015 CONFIGURATION UNIT
1051 DECODING UNIT
1053 DEMODULATION UNIT
1055 DEMAPPING UNIT
1057 RADIO RECEPTION UNIT
1059 CHANNEL MEASUREMENT UNIT
1061 DETECTION UNIT
1071 CODING UNIT
1073 MODULATION UNIT
1075 MAPPING UNIT
1077 RADIO TRANSMISSION UNIT
1079 UPLINK REFERENCE SIGNAL GENERATION UNIT
301 HIGHER-LAYER PROCESSING UNIT
303 CONTROL UNIT
305 RECEPTION UNIT
307 TRANSMISSION UNIT
309 TRANSMIT AND RECEIVE ANTENNA
3011 RADIO RESOURCE CONTROL UNIT
3013 SCHEDULING UNIT
3015 CONFIGURATION UNIT
3051 DECODING UNIT
3053 DEMODULATION UNIT
3055 DEMAPPING UNIT
3057 RADIO RECEPTION UNIT
3059 CHANNEL MEASUREMENT UNIT
3071 CODING UNIT
3073 MODULATION UNIT
3075 MAPPING UNIT
3077 RADIO TRANSMISSION UNIT
3079 DOWNLINK REFERENCE SIGNAL GENERATION UNIT

The invention claimed is:

1. A terminal device comprising:
a receiver configured and/or programmed to receive on a serving cell:
a PCFICH (Physical Control Format Indicator CHannel) with a control format indicator;
a first PDCCH (Physical Downlink Control CHannel) with a DCI (Downlink Control Information) format 1A and with CRC (Cyclic Redundancy Check) parity bits scrambled with C-RNTI (Cell-Radio Network Temporary Identifier); and
a PDSCH (Physical Downlink Shared CHannel) with a DL-SCH (Downlink Shared CHannel); and
a resource determination circuit configured and/or programmed to determine resource elements to which the PDSCH is mapped, a starting OFDM (Orthogonal Frequency Division Multiplexing) symbol for the PDSCH being given by an index $I_{DataStart}$ in a first slot in a subframe, wherein
for the terminal device configured in a transmission mode other than a transmission mode 10, for the serving cell, in a case that the PDSCH is assigned by the first PDCCH with the DCI format 1A, the index $I_{DataStart}$ is given by at least a value of the control format indicator in the subframe of the serving cell,
for the terminal device configured in the transmission mode 10, for the serving cell, in a case that the PDSCH is assigned by the first PDCCH with the DCI format 1A and the transmission of the PDSCH is at least on an antenna port 0, the index $I_{DataStart}$ is given by at least a value of the control format indicator in the subframe of the serving cell,
for the terminal device configured in the transmission mode 10, for the serving cell, in a case that the PDSCH is assigned by the first PDCCH with the DCI format 1A and the transmission of the PDSCH is on an antenna port 7 and a value of a higher layer parameter belongs to a set of values, the index $I_{DataStart}$ is given by at least the higher layer parameter, and
for the terminal device configured in the transmission mode 10, for the serving cell, in a case that the PDSCH is assigned by the first PDCCH with the DCI format 1A and the transmission of the PDSCH is on an antenna port 7 and a value of the higher layer parameter does not belong to the set of the values, the index $I_{DataStart}$ is given by at least a value of the control format indicator in the subframe of the serving cell.

2. The terminal device according to claim 1, wherein the higher layer parameter is determined from a first set of parameters for the serving cell on which the PDSCH is received.

3. The terminal device according to claim 1, wherein the transmission mode other than transmission mode 10 and the transmission mode 10 are associated with the PDSCH.

4. The terminal device according to claim 1, wherein the receiver is configured and/or programmed to receive a second PDCCH with a DCI format 1C, and
for the terminal device configured in a transmission mode 10, for the serving cell, in a case that the PDSCH is assigned by the second PDCCH with the DCI format 1C, the index $I_{DataStart}$ is given by at least a value of the control format indicator in the subframe of the serving cell.

5. The terminal device according to claim 1, wherein the receiver is configured and/or programmed to receive a third PDCCH with a DCI format 2D,
for the terminal device configured in the transmission mode 10, for the serving cell, in a case that the PDSCH is assigned by the third PDCCH with the DCI format 2D and a value of a second higher layer parameter belongs to a set of values, the index $I_{DataStart}$ is given by at least the second higher layer parameter, and
for the terminal device configured in the transmission mode 10, for the serving cell, in a case that the PDSCH is assigned by the third PDCCH with the DCI format 2D and a value of the second higher layer parameter does not belong to the set of the values, the index $I_{DataStart}$ is given by at least a value of the control format indicator in the subframe of the serving cell.

6. The terminal device according to claim 4, wherein the second higher layer parameter is determined from a value of an information field in the third PDCCH with the DCI format 2D.

7. A base station device comprising:
a transmitter configured and/or programmed to transmit on a serving cell to a terminal device:
a PCFICH (Physical Control Format Indicator CHannel) with a control format indicator;
a first PDCCH (Physical Downlink Control CHannel) with a DCI (Downlink Control Information) format 1A and with CRC (Cyclic Redundancy Check) parity bits scrambled with C-RNTI (Cell-Radio Network Temporary Identifier); and
a PDSCH (Physical Downlink Shared CHannel) with a DL-SCH (Downlink Shared CHannel); and a mapping circuit configured and/or programmed to map the PDSCH to resource elements, a starting OFDM (Orthogonal Frequency Division Multiplexing) symbol for the PDSCH being given by an index $I_{DataStart}$ in a first slot in a subframe, wherein for the terminal device configured in a transmission mode other than a transmission mode 10, for the serving cell, in a case that the PDSCH is assigned by the first PDCCH with the DCI format 1A, the index $I_{DataStart}$ is given by at least a value of the control format indicator in the subframe of the serving cell, for the terminal device configured in the transmission mode 10, for the serving cell, in a case that the PDSCH is assigned by the first PDCCH with the DCI format 1A and the transmission of the PDSCH is at least on an antenna port 0, the index $I_{DataStart}$ is given by at least a value of the control format indicator in the subframe of the serving cell, for the terminal device configured in the transmission mode 10, for the serving cell, in a case that the PDSCH is assigned by the first PDCCH with the DCI format 1A and the transmission of the PDSCH is on an antenna port 7 and a value of a higher layer parameter belongs to a set of values, the index $I_{DataStart}$ is given by at least the higher layer parameter, and for the terminal device configured in the transmission mode 10, for the serving cell, in a case that the PDSCH is assigned by the first PDCCH with the DCI format 1A and the transmission of the PDSCH is on an antenna port 7 and a value of the higher layer parameter does not belong to the set of the values, the index $I_{DataStart}$ is given by at least a value of the control format indicator in the subframe of the serving cell.

8. The base station device according to claim 7, wherein the higher layer parameter is determined from a first set of parameters for the serving cell on which the PDSCH is received.

9. The base station device according to claim 7, wherein the transmission mode other than transmission mode 10 and the transmission mode 10 are associated with the PDSCH.

10. The base station device according to claim 7, wherein the transmitter is configured and/or programmed to transmit a second PDCCH with a DCI format 1C, and for the terminal device configured in a transmission mode 10, for the serving cell, in a case that the PDSCH is assigned by the second PDCCH with the DCI format 1C, the index $I_{DataStart}$ is given by at least a value of the control format indicator in the subframe of the serving cell.

11. The base station device according to claim 7, wherein the transmitter is configured and/or programmed to transmit a third PDCCH with a DCI format 2D, for the terminal device configured in the transmission mode 10, for the serving cell, in a case that the PDSCH is assigned by the third PDCCH with the DCI format 2D and a value of a second higher layer parameter belongs to a set of values, the index $I_{DataStart}$ is given by at least the second higher layer parameter, and for the terminal device configured in the transmission mode 10, for the serving cell, in a case that the PDSCH is assigned by the third PDCCH with the DCI format 2D and a value of the second higher layer parameter does not belong to the set of the values, the index $I_{DataStart}$ is given by at least a value of the control format indicator in the subframe of the serving cell.

12. The base station device according to claim 10, wherein
the second higher layer parameter is determined from a value of an information field in the third PDCCH with the DCI format 2D.

13. A radio communication method used for a terminal device, comprising:
receiving on a serving cell:
a PCFICH (Physical Control Format Indicator CHannel) with a control format indicator;
a first PDCCH (Physical Downlink Control CHannel) with a DCI (Downlink Control Information) format 1A and with CRC (Cyclic Redundancy Check) parity bits scrambled with C-RNTI (Cell-Radio Network Temporary Identifier); and
a PDSCH (Physical Downlink Shared CHannel) with a DL-SCH (Downlink Shared CHannel); and
determining resource elements to which the PDSCH is mapped, a starting OFDM (Orthogonal Frequency Division Multiplexing) symbol for the PDSCH being given by an index $I_{DataStart}$ in a first slot in a subframe, wherein for the terminal device configured in a transmission mode other than a transmission mode 10, for the serving cell, in a case that the PDSCH is assigned by the first PDCCH with the DCI format 1A, the index $I_{DataStart}$ is given by at least a value of the control format indicator in the subframe of the serving cell, for the terminal device configured in the transmission mode 10, for the serving cell, in a case that the PDSCH is assigned by the first PDCCH with the DCI format 1A and the transmission of the PDSCH is at least on an antenna port 0, the index $I_{DataStart}$ is given by at least a value of the control format indicator in the subframe of the serving cell, for the terminal device configured in the transmission mode 10, for the serving cell, in a case that the PDSCH is assigned by the first PDCCH with the DCI format 1A and the transmission of the PDSCH is on an antenna port 7 and a value of a higher layer parameter belongs to a set of values, the index $I_{DataStart}$ is given by at least the higher layer parameter, and for the terminal device configured in the transmission mode 10, for the serving cell, in a case that the PDSCH is assigned by the first PDCCH with the DCI format 1A and the transmission of the PDSCH is on an antenna port 7 and a value of the higher layer parameter does not belong to the set of the values, the index $I_{DataStart}$ is given by at least a value of the control format indicator in the subframe of the serving cell.

14. A radio communication method used for a base station device, comprising:
transmitting on a serving cell to a terminal device:
a PCFICH (Physical Control Format Indicator CHannel) with a control format indicator;
a first PDCCH (Physical Downlink Control CHannel) with a DCI (Downlink Control Information) format 1A and with CRC (Cyclic Redundancy Check) parity bits scrambled with C-RNTI (Cell-Radio Network Temporary Identifier); and
a PDSCH (Physical Downlink Shared CHannel) with a DL-SCH (Downlink Shared CHannel); and
mapping the PDSCH to resource elements, a starting OFDM (Orthogonal Frequency Division Multiplexing) symbol for the PDSCH being given by an index $I_{DataStart}$ in a first slot in a subframe, wherein for the terminal device configured in a transmission mode other than a transmission mode 10, for the serving cell, in a case that the PDSCH is assigned by the first PDCCH with the DCI format 1A, the index $I_{DataStart}$ is given by at least a value of the control format indicator in the subframe of the serving cell, the transmission mode other than transmission mode 10 and the transmission mode 10 is associated with the PDSCH, for the terminal device configured in the transmission mode 10, for the serving cell, in a case that the PDSCH is assigned by the first PDCCH with the DCI format 1A and the transmission of the PDSCH is at least on an antenna port 0, the index $I_{DataStart}$ is given by at least a value of the control format indicator in the subframe of the serving cell, for the terminal device configured in the transmission mode 10, for the serving cell, in a case that the PDSCH is assigned by the first PDCCH with the DCI format 1A and the transmission of the PDSCH is on an antenna port 7 and a value of a higher layer parameter belongs to a set of values, the index $I_{DataStart}$ is given by at least the higher layer parameter, and for the terminal device configured in the transmission mode 10, for the serving cell, in a case that the PDSCH is assigned by the first PDCCH with the DCI format 1A and the transmission of the PDSCH is on an antenna port 7 and a value of the higher layer parameter does not belong to the set of the values, the index $I_{DataStart}$ is given by at least a value of the control format indicator in the subframe of the serving cell.

* * * * *